(12) United States Patent
Thomas et al.

(10) Patent No.: US 9,842,667 B2
(45) Date of Patent: Dec. 12, 2017

(54) DOPED-CARBON NANO-ARCHITECTURED STRUCTURES AND METHODS FOR FABRICATING SAME

(75) Inventors: Jayan Thomas, Tucson, AZ (US); Palash Gangopadhyay, Tucson, AZ (US); Binh Au Thanh Duong, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 619 days.

(21) Appl. No.: 13/702,003

(22) PCT Filed: Dec. 27, 2010

(86) PCT No.: PCT/US2010/062160
§ 371 (c)(1),
(2), (4) Date: Dec. 4, 2012

(87) PCT Pub. No.: WO2012/002987
PCT Pub. Date: Jan. 5, 2012

(65) Prior Publication Data
US 2013/0069011 A1   Mar. 21, 2013

Related U.S. Application Data

(63) Continuation-in-part of application No. PCT/US2010/040237, filed on Jun. 28, 2010.
(Continued)

(51) Int. Cl.
*C01B 31/02* (2006.01)
*B82Y 40/00* (2011.01)
(Continued)

(52) U.S. Cl.
CPC .............. *H01B 1/04* (2013.01); *H01B 13/00* (2013.01); *H01M 4/587* (2013.01); *B82Y 40/00* (2013.01);
(Continued)

(58) Field of Classification Search
CPC .......... H01B 1/04; H01B 13/00; C01B 31/02; C01B 31/0293; B82Y 40/00
(Continued)

(56) References Cited

U.S. PATENT DOCUMENTS 7,195,733 B2 * 3/2007 Rogers et al. ............... 264/496
2005/0079356 A1 * 4/2005 Rathenow et al. .......... 428/408
(Continued)

FOREIGN PATENT DOCUMENTS

EP           1 947 220 A1    7/2008
WO    WO 2007/060951 A1    5/2007
WO    WO 2010/151866 A2   12/2010

OTHER PUBLICATIONS

Zhang et al. ("Replica Molding of High-Aspect-Ratio Polymeric Nanopillar Arrays with High Fidelity." Langmuir, 22, pp. 8595-8601, 2006).*
(Continued)

*Primary Examiner* — Tri V Nguyen
(74) *Attorney, Agent, or Firm* — Klarquist Sparkman, LLP

(57) ABSTRACT

In an exemplary method, a nano-architectured carbon structure is fabricated by forming a unit (e.g., a film) of a liquid carbon-containing starting material and at least one dopant. A surface of the unit is nano-molded using a durable mold that is pre-formed with a pattern of nano-concavities corresponding to a desired pattern of nano-features to be formed by the mold on the surface of the unit. After nano-molding the surface of the unit, the first unit is stabilized to render the
(Continued)

unit and its formed nano-structures capable of surviving downstream steps. The mold is removed from the first surface to form a nano-molded surface of a carbonization precursor. The precursor is carbonized in an inert-gas atmosphere at a suitable high temperature to form a corresponding nano-architectured carbon structure. A principal use of the nano-architectured carbon structure is a carbon electrode used in, e.g., Li-ion batteries, supercapacitors, and battery-supercapacitor hybrid devices.

16 Claims, 14 Drawing Sheets

Related U.S. Application Data

(60) Provisional application No. 61/269,656, filed on Jun. 26, 2009.

(51) Int. Cl.
    *H01B 1/04*     (2006.01)
    *H01M 4/587*     (2010.01)
    *H01B 13/00*     (2006.01)

(52) U.S. Cl.
    CPC .......... *Y10S 977/70* (2013.01); *Y10S 977/887* (2013.01); *Y10S 977/932* (2013.01); *Y10S 977/948* (2013.01)

(58) Field of Classification Search
    USPC ............... 252/502–519.1; 423/445 R–447.1; 264/29.1; 977/789, 887
    See application file for complete search history.

(56) References Cited

U.S. PATENT DOCUMENTS

| | | | |
|---|---|---|---|
| 2006/0057448 A1* | 3/2006 | Miyauchi et al. | 429/30 |
| 2006/0159718 A1* | 7/2006 | Rathenow et al. | 424/422 |
| 2007/0128464 A1* | 6/2007 | Jang | 428/688 |
| 2007/0138676 A1 | 6/2007 | Hamaguchi | |
| 2007/0208123 A1* | 9/2007 | Kambe et al. | 524/432 |
| 2008/0318131 A1* | 12/2008 | Watanabe et al. | 429/231.95 |
| 2009/0092747 A1* | 4/2009 | Zhamu et al. | 427/80 |
| 2009/0136809 A1* | 5/2009 | Wang | 429/27 |
| 2009/0258255 A1* | 10/2009 | Terashima et al. | 429/12 |
| 2009/0266418 A1* | 10/2009 | Hu et al. | 136/260 |
| 2009/0278556 A1* | 11/2009 | Man et al. | 324/693 |
| 2010/0092724 A1* | 4/2010 | Shiroya et al. | 428/131 |
| 2011/0086206 A1* | 4/2011 | Scheffer et al. | 428/195.1 |

OTHER PUBLICATIONS

Rahman ("Nanopillar Arrays of Glassy Carbon by Anodic Aluminum Oxide Nanoporous Templates." NanoLetters, 3(4), pp. 439-442, pub 2003).*

Campo ("fabrication Approaches for Generating Complex Micro- and Nanopatterns on Polymeric Surfaces." Chem Rev, 108, pp. 911-945, pub 2008).*

Aryal ("Imprinted large-scale high density polymer nanopillars for organic solar cells." J.Vac.Sci.Tech. B, 26(6), pp. 2562-2566, pub Dec. 1, 2008).*

International Search Report and Written Opinion of the International Searching Authority, dated Mar. 18, 2011, for corresponding International Application No. PCT/US2010/062160, 12 pages.

* cited by examiner

Before nanostructuring

After nanostructuring

DOPED-CARBON NANO-ARCHITECTURED STRUCTURES AND METHODS FOR FABRICATING SAME

CROSS REFERENCE TO RELATED APPLICATIONS

This application is the U.S. National Stage of International Application No. PCT/US2010/062160, filed Dec. 27, 2010, which in turn claims priority to and the benefit of PCT/US2010/040237, filed Jun. 28, 2010, and U.S. Provisional Patent Application No. 61/269,656, filed Jun. 26, 2009, which are incorporated herein by reference in their respective entireties.

FIELD

This disclosure pertains to, inter alia, structures that are made of carbonized material and that comprise molded nano-features such as (but not limited to) nano-rods, nano-pillars, or combinations of specific nano-features. The structures are particularly suitable for use as electrodes (e.g., battery electrodes, supercapacitor electrodes) and the like. The disclosure also pertains to methods for making such structures. In the subject methods a "precursor" structure is cast using a prefabricated, durable mold defining deliberately configured nano-concavities corresponding to the desired nano-features to be formed on the structure. The precursor is formed by application of a carbon-containing "starting material" to the mold. The starting material is a carbon-based polymeric film or analogous material, or a carbon-based substance that can be polymerized or polymerized further, for application to the mold. The starting material in these methods is "doped," which means that the starting material includes one or more additives (that can also be carbon-based, but need not be) that serve to increase or otherwise enhance a particular application(s) and/or activity(ies) of the nano-features compared to undoped but otherwise similar nano-features. After casting, carbonization of the precursor converts it to the corresponding nano-architectured doped-carbon structure.

BACKGROUND

Many types of electrical devices, such as but not limited to batteries, capacitors, and hydrogen-storage devices, include electrodes, plates, or analogous structures made of a carbonaceous material in the form of graphite or carbon (e.g., "activated carbon"). In many instances the efficacy of these structures is a function of the surface area of the structure.

For example, the "anode" in a conventional lithium-ion (Li-ion) battery cell is typically made of graphite, while the "cathode" is typically made of a metal oxide. The materials of both electrodes are ones into which, and from which, lithium ions can migrate. The process of movement of lithium ions into an electrode material is called "insertion" or "intercalation." The process of movement of lithium out of an electrode material is called "extraction" or "deintercalation." Since each lithium ion takes up a finite amount of space, the rate and number of ions that can be intercalated in a given volume of electrode material is a function of the surface area, on a nanometer dimensional scale, of the electrode material. A similar principle is applicable to carbon electrodes, plates, or other structures used in other applications such as supercapacitors.

Since the advent of practical nano-technology, forming nano-structures on an active surface is oftentimes considered for increasing the surface area, especially on a nanometer scale, of the surface. Heretofore, carbon surfaces (including doped carbon surfaces) with nano-sized features have been difficult to fabricate because the conventional technique for forming the nano-sized features involves use of a sacrificial alumina template. See, e.g., Hulteen et al., *NanoStructured Materials* 9:133-136 (1997). The "template" used in the Hulteen method is not really a template at all because it does not provide deliberately formed nano-concavities. Rather, reliance is placed on the natural random porosity of alumina, wherein each unit of alumina has its own natural, unique, random labyrinth of pores, and there is no control from one unit of alumina to the next. In the method, the pores in the alumina are filled with a polymer. Then, the filled template is subjected to a graphitizing condition to convert the polymer to graphite. After carbonization the alumina template is etched away, leaving a carbon structure behind. Depending upon the sizes and shapes of the pores, some of the carbon structure can be considered "nano-structures."

A key disadvantage of the Hulteen and similar techniques is that, since the alumina template is destroyed during use, a new template is required for every nano-structured unit of carbon that is prepared, which is usually a very small unit. Also, this conventional method is very time-consuming, resource-wasteful, expensive, unreliable, too variable, and not amenable to mass-production. Other disadvantages include: (1) The template-etching step is very aggressive and results in substantial chemical and physical damage to any carbon nano-structures that were formed by the alumina. For example, the carbon nano-structures are not ordered, but rather are poorly formed and poorly defined, and it is impossible to form an ordered array of similarly sized and shaped nano-structures. (2) The template-etching step is very difficult to control, leading to highly variable and often unpredictable results. (3) Bulk alumina has voids and thus behaves as a filter material. Filling concavities in an alumina template with a polymer or polymer-forming substance results in molecules of the polymer extending into the voids and migrating throughout the template, including to other surfaces thereof. These penetrated molecules of polymer, when subjected to carbonization conditions, form random nano- and micro-structures that have poor structural fidelity. (4) To etch silica within a reasonable time, the surfaces are exposed to sodium hydroxide, which is complicated to perform on delicate graphite structures and tends to degrade them. Also, even a "reasonable time" for etching is impracticably long, usually several hours or more. (5) Having to etch away the unit of alumina after each use requires a large amount of toxic chemicals and extra procedures, and hence entails high cost. (6) The randomness of the outcome, poor controllability, and poor predictability of the method makes it extremely difficult or impossible to "tune" the process of making nano-architectured graphite, e.g., tuning by customizing process ingredients (including dopant(s)), temperatures, pressures, and other parameters to achieve a particular result (e.g., a particular array of particularly sized and shaped nano-features for producing a desired activity) on a consistent basis. (7) Including additives such as dopant(s) in the polymer is practically impossible because most additives are destroyed in the alumina-etch process. (8) Whatever survives the template-etching process must be cleaned, which is also an aggressive process that degrades the product while adding extra process time and cost. (9) Heating a polymer-filled alumina template to a practical graphitization temperature (above 2000° C.; above 2500° C. for highquality graphite) results in melting of the alumina (melting point at atmospheric pressure is 2070° C.), which destroys the alumina and everything in it and on it. (10) Use of an alumina template inherently cannot form regular arrays of particularly shaped nano-features. Hence, the product is not suitable for any application in which a regular array(s) of nano-features is desirable or necessary.

Certain applications of carbon electrodes would benefit greatly if it were possible to produce electrodes exhibiting particular activities (e.g., specific capacities) that are enhanced more than currently achievable. For example, carbon electrodes with increased specific capacity would be particularly useful in devices requiring fast charging/discharging rates, such as lithium batteries and battery-capacitor hybrid devices. Certain additives (e.g., silicon) are known to have specific capacities greater than carbon or graphite alone, but heretofore it has not been practical to incorporate additives (as "dopants") in carbon electrodes in a way that achieves a reliable and significant increase in the specific capacity of the electrode.

In view of the various deficiencies of conventional methods as summarized above, there are no known reports of making, for example, carbon battery electrodes or capacitor electrodes by such methods. There are also no known reports of such electrodes in which the carbon includes a dopant(s) for achieving enhanced performance or other desired activity level.

In this era of increased demand for more miniaturized electrical devices, the advantages of making smaller power sources are readily apparent. For example, increasing the number of ion-intercalations per unit volume of an electrode material allows correspondingly smaller electrodes, plates, or other structures to be made that exhibit the same or greater performance than their conventional counterparts. Reducing the size of electrodes, plates, and the like also allows correspondingly smaller devices (e.g., batteries, supercapacitors) to be made.

Hence, there is a need for improved methods for making carbon structures, whether doped or non-doped, suitable for use in electrical devices (e.g., batteries, supercapacitors) of progressively smaller size, without sacrificing performance. There is also a need for improved methods for fabricating nano-architectured carbon structures efficiently, consistently, and at high throughput for cost-effective manufacture of high-performance batteries, supercapacitors, and other electric-power devices.

SUMMARY

One object and advantage of the technology disclosed herein is to increase the effective surface area of graphite or other carbonized material used for intercalating ions in electrodes and the like, as used in power-supplying devices, power-storage devices, and other devices employing one or more carbon electrodes or analogous structures. Another advantage is ability to add any of various performance-enhancing additives ("dopants") to the carbonized material without the additives being destroyed in the process. Examples of electrode devices that can be readily produced by the subject methods include, but are not limited to, carbon electrodes in rechargeable Li-ion batteries, supercapacitors, and the like. A conventional Li-ion battery including conventional graphite electrodes can take minutes to hours to recharge after complete depletion of the battery because the lower surface area relative to volume on the surface of the electrodes causes a "traffic jam" of ions at the surfaces of the electrodes. The methods and products disclosed herein can be used to increase substantially the effective surface area of carbon electrodes and the like by providing one or more electrodes with a molded array of carbon-containing nano-features of a desired size, shape, and distribution on the electrode surface, thereby allowing many more charges (such as lithium ions) to be packed into the electrode than is currently possible with conventional graphite electrodes or methods that do not involve nano-structuring. Depending upon the diameter, height, and closeness of packing of the nano-features, every square centimeter of electrode area will provide, by way of example, 5 to 50 $cm^2$ of effective surface area. (Even a doubling of surface area represents a substantial and useful increase.) These increases in the effective surface area can provide, for example, considerable reduction in the charging rates, previously unattainable storage capacities, and the elimination of potential explosive thermal runaway problems during charging or discharging of a power-supply device including the subject nano-structured carbon electrode(s).

Another object and advantage of the disclosed technology is the ability to incorporate any of various additives (termed "dopants") into the nano-structured carbon structure. Dopant(s) are usually added to enhance performance (such as specific capacity, strength, robustness, etc.) of the carbon structure compared to an otherwise similar carbon structure lacking the dopant(s). Multiple dopants can be added readily. A dopant can be carbon-containing, such as graphene plates, carbon nano-tubes, or carbon buckyballs. A dopant can comprise nano-particles of any of various substances such as silicon or other semiconductor, metals, ceramics, catalysts, and the like. A dopant also can comprise a chemical element or compound that becomes distributed as a solute in the carbon structure. A dopant also can be the result of a reaction, in the carbon structure or as the carbon structure is being formed, involving a reactant(s) added during an upstream step to form a desired dopant in situ in the carbon structure.

Therefore, one aspect of the invention is directed to methods for forming nano-architectured carbon structures. An exemplary embodiment comprises:

(1) A suitable polymer or other carbon-containing, moldable starting material is prepared. The starting material includes at least one dopant or at least one substance reactive to form a dopant in situ. The dopant can be in any of various forms, depending upon the particular dopant, including but not limited to particulate, solute, solvent, immiscible liquid, etc. An example particulate dopant is nano-particles of a desired substance such as silicon. Usually, but not necessarily, particulate dopant is uniformly suspended in the starting material.

(2) The starting material can be applied to a substrate surface and, in liquid form, allowed to form a film or other unit mass on the substrate surface. (For convenience and brevity in the description, the term "film" will be understood to encompass not only any of various film-like and membrane-like structures but also any of various other-shaped unit masses that can be nano-structured.) Alternatively or in addition, the starting material can be applied directly to the surface of a prefabricated mold (see below).

(3) The starting material is nano-molded (also called "nano-imprinted") by applying thereto a prefabricated mold (or applying the starting material to the mold surface). The mold comprises a mold surface in which the desired nano-features have already been formed as respective nano-concavities. During nano-molding the starting material may undergo a desired degree of polymerization or a desired degree of further polymerization, or undergo some other change that will facilitate retention and preservation of the nano-features formed thereon.

(4) At completion of molding (also called "nano-imprinting"), the mold and precursor are separated from each other, thereby making the mold available for re-use.

(5) The nano-molded film is stabilized, desirably after removing the mold, without destroying the film or the nano-structures on it. The resulting stabilized nano-molded structure is a "precursor" to the downstream carbonization step.

(6) The precursor is heated in an inert-gas atmosphere to a suitable high temperature to carbonize the precursor and thus form the nano-architectured carbon structure. During carbonization, due especially to the stabilized status of the precursor, the nano-features and dopant(s) survive substantially intact. The particular type of "carbonization" that occurs (e.g., formation of activated carbon versus formation of graphite) depends largely on the temperature at which this step is conducted.

For greatest process simplicity, a dopant desirably is a substance that can be added to the carbon-containing starting material and that will survive downstream process steps (or that will be converted by downstream process step(s) into the desired dopant in the nano-architectured carbon structure). It is also conceived that, depending upon the particular desired location(s) of dopant in the nano-architectured carbon structure, dopant can be added later, such as just before or after performing nano-imprinting. A dopant is any substance that is added into or on the nano-architectured carbon structure to enhance a property, an activity(ies), or other aspect of the nano-architectured carbon structure compared to an otherwise similar carbon structure lacking the dopant. Example dopants include, but are not limited to, nano-particles of silicon (Si) or other semiconductor; nano-particles of tin, iron, or other metal; and nano-particles of carbon, e.g., graphene, carbon nano-tubes, and buckyballs.

In another exemplary method, a nano-architectured carbon structure is fabricated by forming a unit (e.g., a film) of a liquid carbon-containing starting material including at least one dopant. A surface of the unit is nano-molded using a durable mold pre-formed with a pattern of nano-concavities corresponding to a desired pattern of nano-features to be formed by the mold on the surface of the unit. The mold is removed, and the unit is stabilized to render the unit and its formed nano-structures capable of surviving downstream steps. The stabilized unit is a carbonization precursor having a nano-molded surface. The precursor is carbonized in an inert-gas atmosphere at a suitable high temperature to form a corresponding nano-architectured carbon structure, giving due respect to the particular dopant(s).

A key distinction of the subject methods and products made thereby pertains to their connection with and utilization of "nano-molding." As used herein, "nano-molding" or "nano-imprinting": is the forming of a desired cast pattern of a substance by action including contacting a liquid or other castable form of the substance with a pattern-defining object (a mold, template, printing plate, or the like). E.g., the mold is applied to a surface of the castable substance, which results in the pattern being formed on the surface according to the pattern on the pattern-defining object, and after which the pattern-defining object can be removed from the surface. "Nano-molding" is simply molding on a nano-scale; i.e., the molded are or include "nano-features." In the subject methods the pattern of nano-features to be molded is defined by the mold. The castable substance (e.g., a film of the substance) and mold are brought together, which results in replication of the pattern on a surface of the film. This "bringing together" of the mold and film need not involve application of pressure. It is unnecessary that the mold be pressed onto the surface of the film (or vice versa), although this protocol is used in some embodiments. In other embodiments it is sufficient to apply the starting material to the mold. In other embodiments the starting material is applied as a film to the surface of a substrate, followed by contacting the film with the mold. Spin-coating is a particularly effective way in which to apply the starting material to the mold or substrate. An alternative way is blade-spreading. In any event, after the pattern is replicated onto the film, the mold is free for use in nano-molding the next film or a next region on the same film. Thus, it will be understood that nano-molding, as used herein, is readily distinguishable from conventional techniques involving use of a sacrificial, random template, and that "nano-molded carbon" is distinguishable from conventional forms of carbon having nano-sized structures. This distinction also applies to the presence of one or more dopants in the nano-molded carbon.

Nano-molding as described herein offers a number of benefits over conventional methods, including: (1) The desired pattern of nano-features is formed with extremely high fidelity on the surface of the film and is retained with high fidelity through carbonization. (2) The results of the process are highly accurate and precise, as well as predictable. (3) The process is easily "tuned" and/or customized. For example, a predetermined target area-enhancement factor is readily achieved. As another example, the starting material can include any of various dopants or dopant precursors for achieving specific functional objectives in which composition of the carbon or graphite nano-features is important for their particular application or function. (4) The nano-features can be formed in very accurate arrays of substantially any type and configuration, according to the mold, in contrast to conventional methods that form random nano-structures. Particular arrays can be very important for filling specific performance applications. (5) The process can be performed very rapidly (e.g., a few minutes compared to hours to days to perform a conventional process). (6) The process is readily automated or otherwise configured for mass-production. (7) Since there is no downstream template-etching step, various additives can be added to the starting material for incorporation into the nano-features of the corresponding carbon structure without the additives being chemically destroyed. (8) This process can be extended to make nano-structures of any material that is in a liquid form (or can be dissolved in a liquid solvent) and can form a film by any of the film-casting techniques such as (but not limited to, spin coating, blade-casting, dip coating, etc. (9) In general, from a commercial standpoint but not intending to be limiting, the nano-molded carbon generally provides an effective surface area that is at least double the effective surface area of an otherwise similarly sized unit of bulk carbon. (10) Also from a commercial standpoint but not intending to be limiting, the nano-molded carbon includes carbonized nano-features having an aspect ratio of at least 2:1. Finally, (11) for the first time, doped "nano-molded carbon" is now available, such as a unit of carbon comprising at least one nano-molded region and including at least one dopant.

As noted, the mold (also called "template") used in the various embodiments described herein is not a sacrificial template. Rather, the mold remains intact and can be re-used multiple times, even hundreds or more times. For example, a single mold can be used to produce a large number of individual nano-architectured structures. In other embodiments a single mold can be used to nano-mold multiple respective regions on a unit of starting material. Thus, the methods disclosed herein are readily used in automated processes in which multiple nano-architectured carbon structures are produced continuously, inexpensively, consistently, reliably, and efficiently.

A principal use of nano-architectured carbon structures as disclosed herein is a carbon electrode used in, e.g., Li-ion batteries, supercapacitors, and battery-supercapacitor hybrid devices. The various uses extend as widely as the various uses of carbon active surfaces.

The foregoing and other objects, features, and advantages of the invention will become more apparent from the following detailed description, which proceeds with reference to the accompanying figures.

DETAILED DESCRIPTION

Figure 1A:
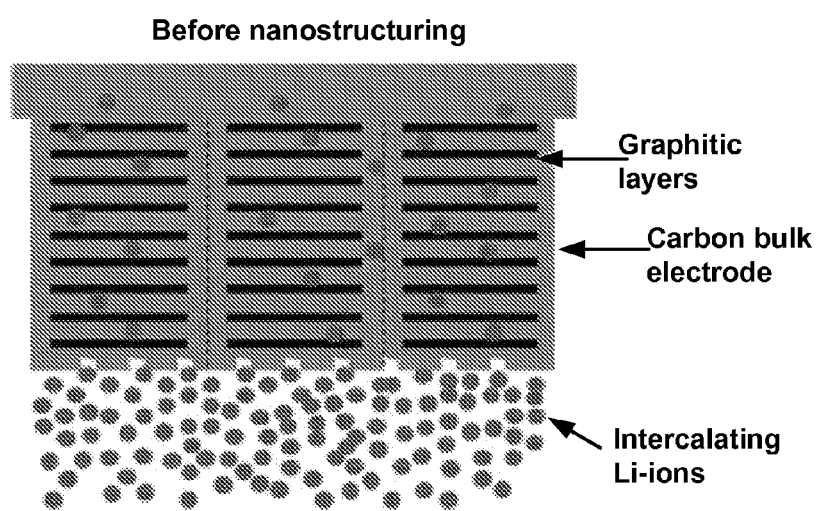
FIG. 1A is a schematic diagram of intercalation of Li ions into a bulk-carbon electrode.

The following disclosure is presented in the context of representative embodiments that are not to be construed as being limiting in any way. Instead, this disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Although the operations of the disclosed methods are described in a particular, sequential order for convenient presentation, it should be understood that this manner of description encompasses rearrangement of the operations, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other things and methods.

Terms

The following explanations of terms are provided to better describe the present disclosure and to guide those of ordinary skill in the art in the practice of the present disclosure.

This disclosure sometimes uses terms like "produce," "generate," "select," "receive," "exhibit," and "provide" to describe the disclosed methods. These terms are high-level abstractions of the actual operations that are performed. The actual operations that correspond to these terms may vary depending on the particular implementation and are readily discernible by one of ordinary skill in the art.

The singular forms "a," "an," and "the" include the plural forms unless the context clearly dictates otherwise. The term "includes" means "comprises." Unless the context dictates otherwise, the term "coupled" means mechanically, electrically, or electromagnetically connected or linked and includes both direct connections or direct links and indirect connections or indirect links through one or more intermediate elements not affecting the intended operation of the described system.

Certain terms may be used such as "up," "down," "upper," "lower," and the like. These terms are used, where applicable, to provide some clarity of description when dealing with relative relationships. But, these terms are not intended to imply absolute relationships, positions, and/or orientations.

The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about" or "approximately." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

The following additional terms may be used in the descriptions of one or more embodiments.

An "anode" is an electrode through which electric charge flows into a polarized electrical device. From an electrochemical point of view, negatively-charged anions move toward the anode and/or positively-charged cations move away from it to balance the electrons arriving from external circuitry. In a discharging battery, such as a lithium-ion battery or galvanic cell, the anode is the negative terminal where electrons flow out of the battery. If the anode is composed of a metal, movement of electrons to the external circuit is accompanied by movement of metal cations away from the electrode and into the electrolyte.

The "capacity" of a battery is the amount of electrical charge a battery can deliver. The capacity is typically expressed in units of milliamp-hours (mAh), or amp-hours (Ah), and indicates the maximum constant current a battery can produce over a period of one hour. For example, a battery with a capacity of 100 mAh can deliver a current of 100 mA for one hour or a current of 5 mA for 20 hours.

"Carbonization" is the conversion of an organic (carbon-containing) precursor substance into a corresponding carbon or a carbon-containing structure. A carbon-containing structure of activated carbon is usually formed by pyrolysis or destructive distillation of the carbon-containing precursor in an inert atmosphere. These processes require application of heat, but the required temperature is relatively low. A carbon-containing structure of graphite is formed at very high temperature, usually under an inert-gas atmosphere.

A "cathode" is an electrode through which electric charge flows out of a polarized electrical device. From an electrochemical point of view, positively charged cations invariably move toward the cathode and/or negatively charged anions move away from it to balance the electrons arriving from external circuitry. In a discharging battery the cathode is the positive terminal, toward the direction of conventional current. This outward charge is carried internally by positive ions moving from the electrolyte to the positive cathode.

A "cell" is a self-contained unit having a specific functional purpose. Examples include voltaic cells, electrolytic cells, and fuel cells, among others. A "battery" includes one or more cells. The terms "cell" and "battery" are used interchangeably when referring to a battery containing only one cell.

A "dopant" is an additive (that can also be carbon-based, but need not be) that serves to increase or otherwise enhance a particular application(s) and/or activity(ies) of the nano-features in the carbon structure compared to undoped but otherwise similar nano-features. A dopant can be formulated to be added early in the process and survive downstream high-temperature steps. Alternatively the dopant can be the result of conversion, during the process, of one or more reactants that form the dopant in situ under a condition encountered in the process. Example dopants include but are not limited to nano-particles of semiconductor such as silicon, nano-particles of metal such as tin or iron, and nano-particles of carbon such as graphene, carbon nano-tubes, and carbon buckyballs. Silicon dopant can be the result of a reaction allowed to occur during the process, such as in situ conversion of silica into silicon.

A "film" is a thin layer of a material formed or deposited on a typically rigid substrate.

"Graphite" is a carbon-containing substance that is formed in certain operations disclosed herein. Graphite is an electrically conductive allotrope of carbon having a layered structure. In each layer the carbon atoms are covalently bonded to each other in a hexagonal lattice called "graphene." Converting a carbon-containing precursor substance (e.g., a polymer) to graphite requires application of very high temperature and other controlled conditions.

"Intercalation" refers to the insertion of a material (e.g., an ion or molecule) into the micro- or nano-structure of another material. For example, lithium ions can insert, or intercalate, into graphite to form lithiated graphite ($LiC_6$). Note that each graphene unit ($C_6$) can hold a maximum of one intercalated lithium ion. Intercalation also can be performed and/or enhanced by particular dopant(s), such as silicon nano-particles distributed in the carbon structure.

An "ion-insertion (or intercalation) material" is a compound capable of intercalating ions reversibly without exhibiting an irreversible change in its micro- or nano-structure. For example, a lithium-ion insertion material is capable of intercalating lithium ions. One example of a lithium-ion insertion material is graphite, as formed in various methods as disclosed herein. Intercalation of lithium into graphite, discussed briefly in the preceding paragraph, forms $LiC_6$. De-intercalation of lithium ions from $LiC_6$ re-forms the graphite. Thus, intercalation and de-intercalation do not irreversibly change the micro- or nano-structure of the graphite. Enhanced intercalation and de-intercalation can be the goal of added dopant(s).

A "membrane" is a thin, usually pliable, sheet of synthetic or natural material. A "permeable membrane" has a porous structure that permits ions and small molecules to pass through the membrane. In a battery, the current density and operational lifetime of the battery are factors in selecting the degree of membrane permeability for the battery. Some membranes are "semipermeable" or "selective" membranes, through which certain ions or molecules with particular characteristics pass more readily than other ions or molecules.

A "nano-architectured" or "nano-structured" system or device includes one or more features ("nano-features") of interest that, from execution of a process controlled ultimately by the hand of man, is sized in a range from the size of individual atoms or molecules (Ångstroms) to about 200 nanometers (nm). For example, a nano-pillar or nano-post may have a diameter of 200 nm and a length of 500 nm or more; nevertheless it is still regarded as a nano-feature because of its diameter. A nano-architectured or nano-structured system comprises multiple nano-features of a desired configuration(s) on at least one surface thereof. The nano-features can be ordered or arrayed in a particular pattern or distribution on the surface. An example of a nano-feature is a nano-pillar in a formed array thereof.

"Permeable" means capable of being passed through. This term is used especially for materials through which gases or liquids may pass.

A "pore" is any of various openings or void spaces in a solid substance of any kind. Pores are characterized by their diameters. According to IUPAC notation, "micropores" are small pores with diameters less than 2 nm, "mesopores" are mid-sized pores with diameters from 2 nm to 50 nm, and "macropores" are large pores with diameters greater than 50 nm. Porosity is a measure of the void spaces or openings in a material, and is measured as a fraction, between 0 and 1, or as a percentage between 0 and 100%.

"Porous" is a term used to describe a matrix or material that is permeable to fluids (such as liquids or gases). For example, a porous matrix is a matrix that is permeated by a network of pores (voids) that may be filled with a fluid. In some examples, both the matrix and the pore network (also known as the pore space) are continuous, so as to form two interpenetrating continua. Many materials such as cements, foams, metals and ceramics can be prepared as porous media.

A "separator" is a porous sheet or film placed between the anode and cathode of a battery. The separator prevents physical contact between the anode and cathode while facilitating ionic transport between these electrodes through the separator.

A portion of the following description is set forth in the context of electrodes for lithium-ion (Li-ion) batteries. This context is not to be construed as limiting in any way the technology disclosed herein. I.e., the disclosed methods and products produced thereby are not limited to fabricating electrodes for Li-ion batteries. Various types of electrical devices utilize carbon electrodes, and many of these electrical devices would benefit from an increase in the effective surface area of at least one electrode thereof according to the methods disclosed herein. Presenting this discussion in the context of Li-ion battery electrodes is readily understood and extrapolated to other devices and applications.

Lithium-Ion Battery

A single cell of a lithium-ion (Li-ion) battery comprises two electrodes that participate in electrochemical reactions to produce energy: an anode (negative electrode when discharging) and a cathode (positive electrode when discharging). The anode and cathode are immersed in an electrolyte, and a separator is situated between them. See FIG. 12. Li-ion batteries produce energy through electrochemical reactions occurring between the anode and cathode. Typically, both the anode and cathode are made of materials into which, and from which, lithium ions can intercalate and de-intercalate. During battery discharge, lithium ions de-intercalate from the anode material and migrate to the cathode into which they intercalate. During a charging cycle, the opposite reaction occurs, i.e., lithium ions detach from the cathode material and migrate back to the anode where they re-intercalate.

Figure 12:
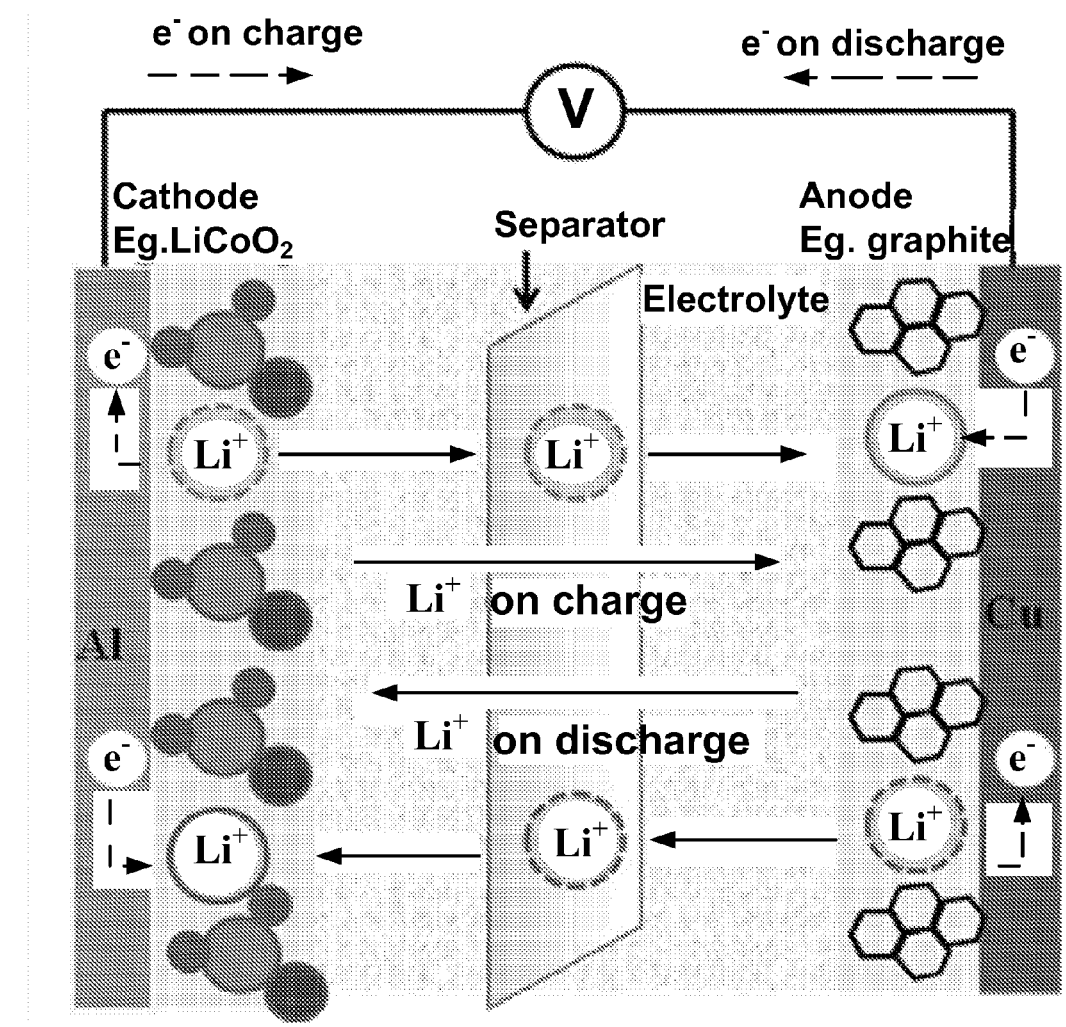
FIG. 12 is a schematic diagram of the mechanism of operation of a typical Li-ion battery that relies upon intercalations occurring at the electrodes. The particular battery shown comprises an anode configured as graphite on copper, and a cathode configured as $LiCoO_2$ on aluminum.

A conventional Li-ion battery typically has a graphite anode, typically configured as a layer of graphite on a metal such as copper. The cathode typically is an oxide of lithium and a transition metal, e.g., lithium cobalt oxide ($LiCoO_2$). Other common cathode materials include $LiMn_2O_4$, $LiFePO_4$, $LiNiO_2$, and others. Common electrolytes include lithium salts (e.g., $LiPF_6$, $LiBF_4$, $LiClO_4$) dissolved in organic solvents (e.g., ethylene carbonate, propylene carbonate, dimethyl carbonate, ethyl methyl carbonate, and combinations thereof). The anode and cathode are electrically insulated from each other by a porous separator through which ionic transport can take place. These electrode materials are surrounded by the electrolyte. The electrodes are solid and electro-active, serving as a solid host into which guest ionic species are reversibly intercalated from the electrolyte. During the discharging process of the battery, lithium ions are extracted from the anode and inserted into the cathode (FIG. 12). The reverse process, i.e., the extraction of the lithium ions from the cathode and their insertion into the anode, takes place during charging.

More specifically, in a conventional Li-ion battery, charging occurs when lithium ions migrate from the cathode (e.g., $LiCoO_2$) to the anode, as shown in the following representative forward reactions:

cathode half reaction: 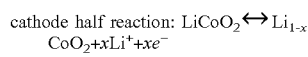

anode half reaction: 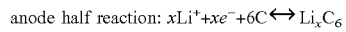

Discharge occurs when the reactions run in reverse.

Currently, graphite is the optimized anode material and lithiated metal oxide such as $LiCoO_2$ is the cathode used in most of the commercially available Li-ion batteries. The active electrode materials are usually combined with a binder (e.g., polyvinylene fluoride) and conductive additives (e.g., carbon black/graphite) prior to deposition onto a current-collector metal film. The separator used is a semiporous polymer such as polypropylene or polyethylene film for Li-ion transport. The intercalation process is aided by the formation of a solid electrolyte interface (SEI) at the surface of each electrode that passivates the electrode surface from further solvent reduction and acts as a selective layer to allow only the diffusion of Li-ions. Typically, the composite electrode thickness is in the range of 75 to 200 μm and the current-collector foil thickness is in the range of 12 to 20 μm.

In a Li-ion battery, an anode and/or a cathode having increased surface area can provide substantially increased charging rate and energy capacity (due to better packing of lithium ions), per unit weight and/or volume, than produced by an otherwise similar Li-ion battery having electrodes with less surface area. The higher power and/or higher storage capacity (charging density) can allow the size (and hence mass) of a Li-ion battery to be reduced, which can reduce the overall size of a device powered by the battery.

More specifically, the charging rate, lifetime, and power density of a Li-ion battery largely depend on the active surface area and porosity of the carbon in the anode. Hence, surface-area enhancement of the carbon in the anode can produce faster charging of the battery, more power storage in the battery, and faster discharge (in other words, better battery "performance"). The methods discussed below are especially applicable to increasing the active surface area of the carbon in the anode. For example, a nano-architectured graphite anode, fabricated as described herein, can produce a several-fold increase in charging rate. Doping the carbon electrode with suitable materials can result in a substantial enhancement of energy storage in the battery, as well as charging and discharging rates.

Figure 1B:
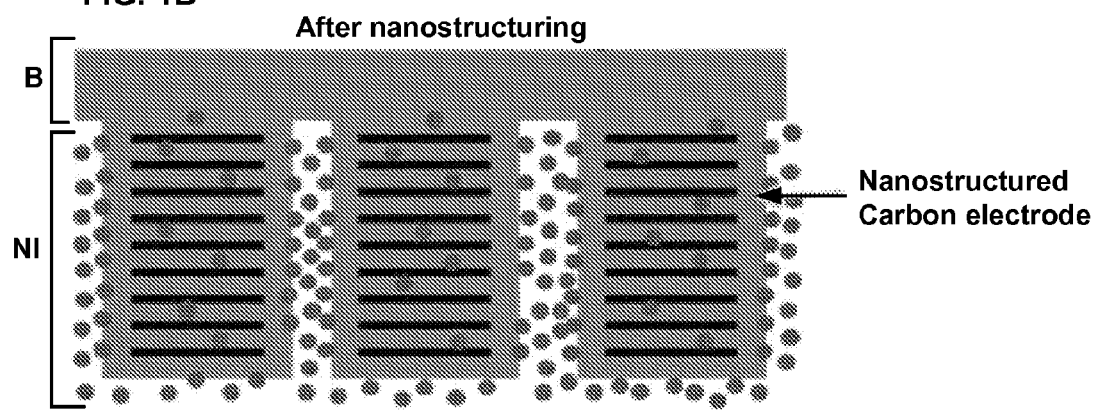
FIG. 1B is a schematic diagram of Li-ion intercalation into a nano-structured carbon electrode made as described herein.
Figure 2A:
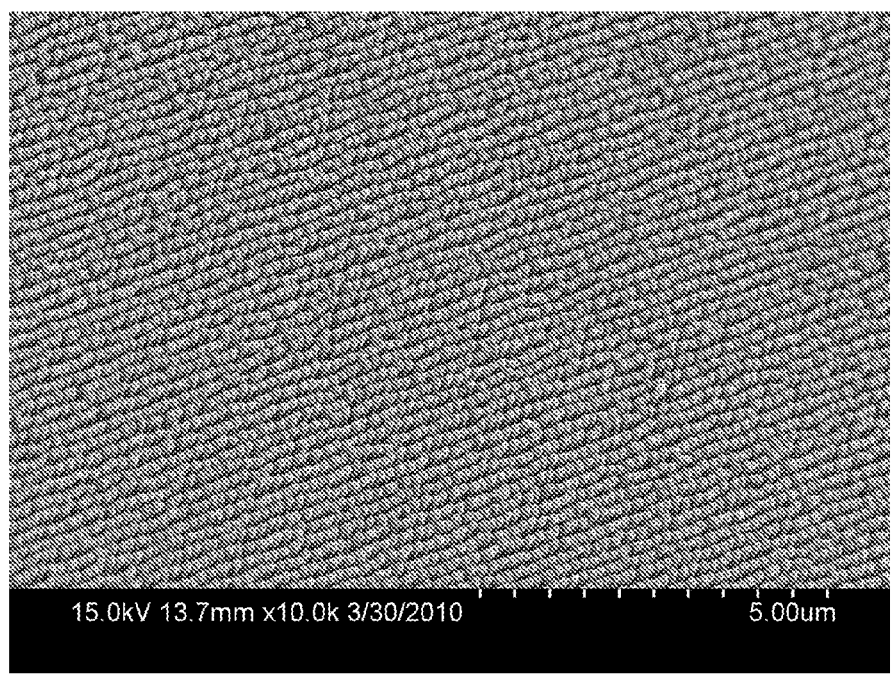
FIG. 2A is a scanning electron microscopy (SEM) image of carbon nano-pillars as nano-molded using a method as described herein.
Figure 2B:
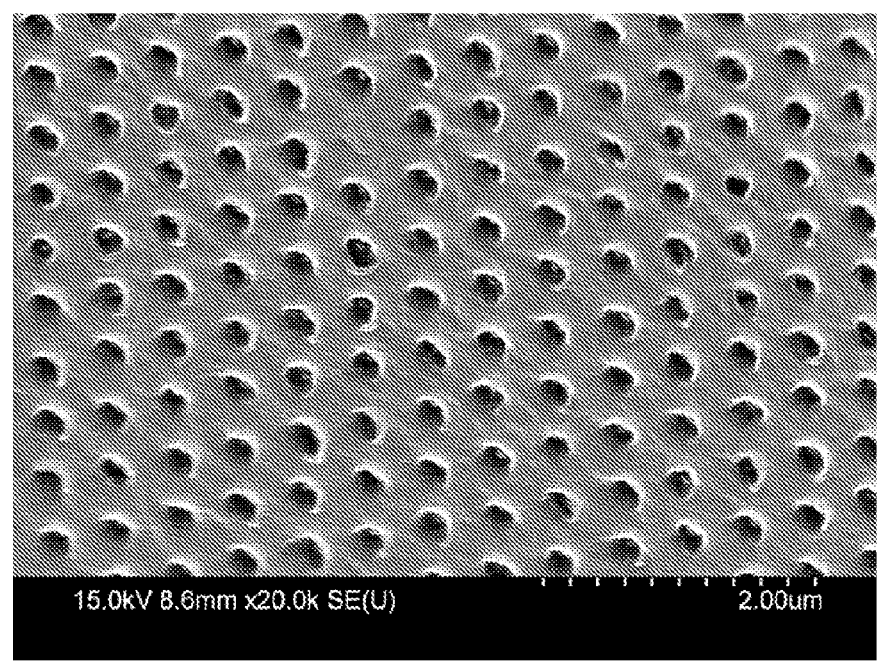
FIG. 2B is an SEM image of a printed nano-hole array.

In a conventional Li-ion battery, charge and discharge rates are low basically because the lithium ions intercalate into the bulk material of the battery electrode as well as on the surface of the material. The rate of this intercalation is low due to a "traffic jam" caused by the ions blocking the intercalation pathway. Schematic diagrams showing intercalation of lithium ions in bulk and nano-structured carbon electrodes (the latter formed as described herein) are shown in FIGS. 1A and 1B, respectively. Each figure shows a respective unit of carbon. The thick horizontal lines represent the graphene/carbon layers. The dots denote lithium ions. Note that the number of dots in the two images is the same. Although not shown in the figures, the number of carbon nano-pillars that are nano-molded by the subject methods in a 1-cm² electrode area is several billions. An SEM image of nano-molded carbon nano-pillars is shown in FIG. 2A. Once a carbon nano-structure is prepared, this can be used to mold further nano-structures. An array of nano-holes prepared from a nano-molded pillar structure is shown in FIG. 2B. We have prepared several tens of nano-hole arrays from a single nano-molded pillar structure. This reduces the dependence upon electron-beam microlithography to make new molds for the fabrication of structures with various dimensions of nano-features.

In the unit of carbon shown in FIG. 1B, the upper region B is an example "bulk portion." The bulk portion shown in the figure includes a nano-molded region NI that is a surficial region of the bulk portion. The thickness of the bulk portion cn be varied as required.

Nano-Molding a Unit of Carbon-Containing Starting Material

Methods according to various embodiments include the formation of a nano-molded film (or other unit) of a carbon-containing starting material that can be converted to graphite, activated carbon, or otherwise carbonized. In some embodiments the nano-molded film is formed on a surface of a substrate serving as a base for the film. The substrate can be flexible or rigid. A rigid substrate can be made of, for example, pure metal, metal oxide, metal alloy, or a combination thereof. Specific examples are copper, copper alloy, nickel, nickel alloy, or a combination thereof. Other possible rigid substrate materials include glass or ceramic. A flexible substrate can be made of, for example, a pyrolysis-resistant plastic material, a sufficiently thin metal, mineral cloth, carbon cloth, or carbon/carbon-nanotube based cloth. The choice of substrate material will depend at least in part on whether a downstream carbonizing process will be a graphite-producing process or a process for forming activated carbon, and whether the substrate is to remain with the nano-structured film during carbonization. The choice of substrate is more limited if graphite is to be formed because many materials that otherwise would be useful as substrates cannot withstand the high temperature required to form graphite.

In some embodiments the substrate is not only flexible but also bendable, foldable, and/or rollable. Thin and/or flexible substrates tend not to be suitable for graphite-producing processes, but many are suitable for other carbonization processes, such as pyrolysis.

The carbon-containing starting material can be an organic polymer. Key criteria in the selection of the starting material is whether the desired nano-features can be nano-molded of it and whether the material and nano-features molded thereon are capable of withstanding downstream process conditions (including pyrolysis or conversion to graphite) without collapsing, deforming, or otherwise becoming destroyed or unusable. A thermoplastic generally can be heated sufficiently to render it fluid for nano-molding, without causing destruction of the material itself, and subsequent reduction in temperature rigidifies the thermoplastic. But, most thermoplastics may become too fluid to support the nano-features during the temperature increases required for carbonization. Hence, they may not be useful for making nano-molded carbon electrodes. On the other hand, many thermosets are too crosslinked to melt and/or are irreversibly thermally damaged by temperature increases. Hence, these thermosets also cannot be used to make nano-molded carbon electrodes. Another consideration is whether the particular starting material is compatible with any dopants or dopant precursors to be added thereto.

A particularly advantageous starting material is polyacrylonitrile (PAN). Although PAN is a thermoset, it can be obtained in a relatively low-crosslinked form that can be fluidized by, for example, dissolution in a suitable solvent for nano-molding. To reduce shrinkage during carbonization, most of the solvent is evaporated off before commencing actual nano-molding. An exemplary solvent for PAN is dimethylformamide. Nano-molding can be done simply by spin-coating or blade-casting a layer of this solution on the surface of the mold and transferring the resulting nano-molded layer to a substrate that can be heated to high temperature for carbonization. This process is clearly different from the conventional nano-imprinting lithography (NIL) technique in which nano-structuring is done by pressing a template at high temperature and pressure onto a resist deposited on a substrate. In the NIL process, high temperature and pressure, or UV light, are necessary to produce nano-structures. However, in our process, nano-molding is performed without using any of the above conditions. After nano-molding and desirably after the mold is removed, PAN is "stabilized" by a moderate increase in temperature that cyclizes the molecules. PAN stabilization preserves the nano-features in the film during the carbonization process, allowing an activated-carbon or graphite version of the nano-molded polymer to be made. During carbonization, stabilized PAN advantageously does not melt. Another advantage of PAN is that more than 60% of the material is converted to carbon structure during carbonization, compared to 50%-60% in many other materials.

Alternatively to PAN, the starting material can be another thermoset that is initially a liquid film-forming resin and that can be stabilized (e.g., partially or completely cross-linked) by progressive application of a suitable electromagnetic radiation (e.g., ultraviolet light). This allows the starting material to flow during formation of a film, followed by achieving a certain degree of cross-linking or other stabilization sufficient to rigidify the polymer during contact with the mold, thereby allowing the mold to be removed without destruction or significant damage to the nano-features.

Other possible carbon-containing starting materials are cellulose, kapton, polyphenylcarbyle, tar, and pitch. "Carbon-containing" means not only including carbon atoms in the molecular structure of the starting material, but also being convertible, upon application of a suitable condition, to graphite, activated carbon, or other carbonized material. The starting material can be "solid" or liquid. An exemplary "solid" starting material is comminuted (e.g., powdered) and can be fluidized (e.g., by bringing to its melting temperature or glass-transition temperature) sufficiently for nano-molding (see below). An exemplary liquid starting material is a solution of a suitable polymer. Powdered or other comminuted solid starting materials can be applied simply by dispensing. Liquid starting materials can be applied by screen-printing, spin-coating, spraying, blading, or other suitable method. Spin-coating is especially effective because it can be done quickly, and the results are highly predictable and controllable.

Another criterion of the starting material is the ability, when nano-molded, to form nano-features that retain their desired sizes, shapes, and postures during subsequent steps leading up to and including carbonization. Another criterion is the ability of the material to support any dopants added thereto, such as but not limited to nano-particles of Si and/or metal, particularly over repeated cycles of intercalation and de-intercalation. Yet another criterion in some embodiments is the ability of the starting material to allow desired dopant-forming and/or dopant-conversion reactions during the processes of forming the carbonization precursor and carbonization.

Nano-structures are formed on at least one surface of the carbon-containing film using a "mold" (or "template") having a surface in which the desired nano-features have already been defined as respective nano-concavities. Forming nano-structures on the surface of a polymer (or other suitable material) from the mold is called "nano-molding." In some embodiments the starting material is applied to the surface of a substrate, followed by application of the mold to the starting material. In other embodiments a layer of the starting material is applied to the surface of the mold, followed by application of the starting material (desirably while still being attached to the surface of the mold) to a substrate.

Whereas in some embodiments, nano-features are molded on one surface of a precursor, other embodiments of the subject methods include molding nano-features on two or more sides of the precursor. In certain applications, such a structure can produce a substantially greater enhancement (e.g., 20-fold or more) over the enhancement produced by nano-structuring only one surface, depending upon the size and aspect ratio of the nano-features in the exposed surface area. These films can be used as-is, as free-standing nano-structured films, or can be used in conjunction with, or attached to, highly conductive substrates (e.g., carbon cloth) in electrodes for devices such as but not limited to supercapacitors.

To nano-mold the starting material on multiple surfaces thereof, multiple respective molds can be used. For example, "double-sided" molding can be performed simultaneously using two molds on opposite sides of the starting material, or first with one mold and then with a second mold (or with the same mold as used on the first side but now used on the second side). The molds can have similar nano-concavities and/or array(s) thereof, or the array and/or concavities can be different in each mold, as desired or required.

The mold(s) and starting material are brought together so as to "nano-mold" the starting material with the desired pattern of nano-features in the mold(s). Nano-molding requires that the starting material be sufficiently fluid to flow relative to the substrate and the mold as well as readily enter the nano-concavities in the surface of the mold.

Either before or after removing the mold(s) from the starting material that has been nano-molded, a condition is applied (e.g., a thermal condition and/or a radiative condition, suitable for gelling, partial polymerizing, partial cross-linking, partial cyclizing, stabilizing, or the like, of the starting material) to ruggedize the starting material sufficiently to preserve the integrity of the nano-features formed thereon and to survive downstream carbonization. In general, this application of the conditions and its result are termed "stabilization." With PAN, stabilization can be performed after removing the mold. Other materials may require that stabilization be performed before removing the mold. An example of a radiative condition is application of a wavelength and intensity of UV light sufficient to achieve a desired degree of polymerization of a UV-curable starting material. An example thermal condition is application of an elevated temperature sufficient to polymerize, further polymerize, cyclize, cross-link, or otherwise rigidify or ruggedize the starting material. Either condition may be applied under a reduced-pressure ("vacuum") environment or special atmosphere such as an inert-gas environment. An example inert gas in this regard is nitrogen, argon, or other noble gas. In some embodiments the condition leading to stabilization is both radiative and thermal.

Removing the mold leaves, on the surface of a nano-molded carbon-containing film, the desired profile of nano-features. The nano-features can be, for example, configured as rods or pillars, corresponding to a desired architecture, size, and placement. The nano-features can be in an ordered array or arrays as desired, or a deliberately random array. The nano-features need not all be the same size, the same shape, or ordered the same way over the entire surface. Also, the nano-features need not be present over the entire surface.

In view of the above, the starting material desirably is or can be rendered sufficiently fluid for nano-molding while also being sufficiently gellable, curable, settable, rigidizable, or the like to allow the mold to be removed after nano-molding without significantly destroying, collapsing, or otherwise disrupting the formed nano-features formed on the film. Also, depending upon the application, the starting material desirably is one that (especially in its prevailing condition at the time the mold is removed) is convertible to a corresponding graphite, activated carbon, disorganized carbon, or other carbonized material. Furthermore, the starting material is one that, after being nano-molded and stabilized, is capable of withstanding the carbonizing condition without becoming destroyed and without the nano-features becoming destroyed. This capability of withstanding the carbonizing condition desirably applies to any dopants in the starting material.

There is no limit on the size and shape of the carbon-containing film. From one practical standpoint, the size and shape are dictated, at least in part, on the size and shape of the mold used. The entire unit of starting material need not be molded at the same time. For example, a large-area nano-structured electrode (film) can be developed by transferring the printed structure on the mold to the different regions of the substrate by moving the mold each time to a different region of the substrate. Embodiments are also contemplated in which supplying the substrate, applying the starting material, bringing the mold(s) and starting material together, and applying rigidifying conditions are coordinated and automated for continuous or semicontinuous production.

The polymer film including the cast nano-features constitutes a "nano-molded" precursor (or simply "precursor") useful for preparing a corresponding nano-architectured carbon structure such as or as used in, for example, a nano-structured graphite or nano-structured activated carbon electrode.

Doped Starting Material

Non-doped starting material is called herein "pristine." Alternatively to pristine starting materials, the starting material can include (i.e., be "doped" with) any of various additives. A "dopant" in this context is a substance that, when present in the nano-structured carbonized material, enhances the performance of the material compared to otherwise similar material lacking the dopant. A dopant can substantially improve the performance of electrodes and other devices made of the nano-architectured carbon structures, compared to otherwise similar structures lacking dopant. For example, in some embodiments the starting material destined to be carbonized can be doped with particles of one or more semiconductor materials, one or more metals or other enhancers of electrical conductivity, one or more carbon structures such as graphene or carbon nano-tubes, or one or more other materials capable of withstanding the carbonizing condition and contributing usefully to performance of the electrode thus formed. Example dopants in this regard include, but are not limited to, silicon (Si) nanoparticles, tin nanoparticles, iron nanoparticles, carbon nano-tubes, graphene, etc. In certain embodiments dopant particles are in substantially uniform suspension in the starting material. As noted, the particles desirably are, but need not be in some embodiments, "nano-sized." A suitable dopant for many embodiments is a material capable of withstanding carbonization conditions intact, such as Si nanoparticles.

In certain embodiments a dopant is formed from a reactant that is added to the starting material and, under the carbonization condition or during another process step, reacts to form the desired dopant in situ.

An exemplary dopant comprises Si nano-particles. A key rationale behind use of this dopant arises from the theoretical specific capacity of Si, which is approximately 4200 mA·h·g$^{-1}$, compared to 372 mA·h·g$^{-1}$ for graphite. Silicon-doped graphite/carbon electrodes produced by methods as described herein can be used advantageously as, for example, intercalation electrodes in lithium-ion batteries. The doped electrodes provide high specific capacity and fast charge-discharge rates due to their increased energy density. These electrodes can be produced from PAN doped with Si nanoparticles.

A demanding requirement of a battery or supercapacitor device is cycling stability. Particles of certain lithium intercalators can expand upon intercalating Li ions, which generates stresses that can cause physical (and thus electrical) disconnection of the particles in the electrodes, with resulting loss of capacity. In Si-doped nano-structured carbon electrodes produced by methods as described herein, expansion of the Si nano-particles from Li-ion intercalation is accommodated and absorbed by the carbon layers (FIG. 13), which relieves expansion stresses. Also, electrical connectivity is still provided by the carbon layers, unlike a conventional silicon-only device. Consequentially, the cycling stability of the subject doped-carbon electrodes is substantially enhanced (e.g., by several tens of thousands). The nano-architecture of the electrodes also inhibits lithium plating, which enables a hybrid device comprising such electrodes to be more reliable than a conventional lithium-ion battery.

Mold

Figure 3:
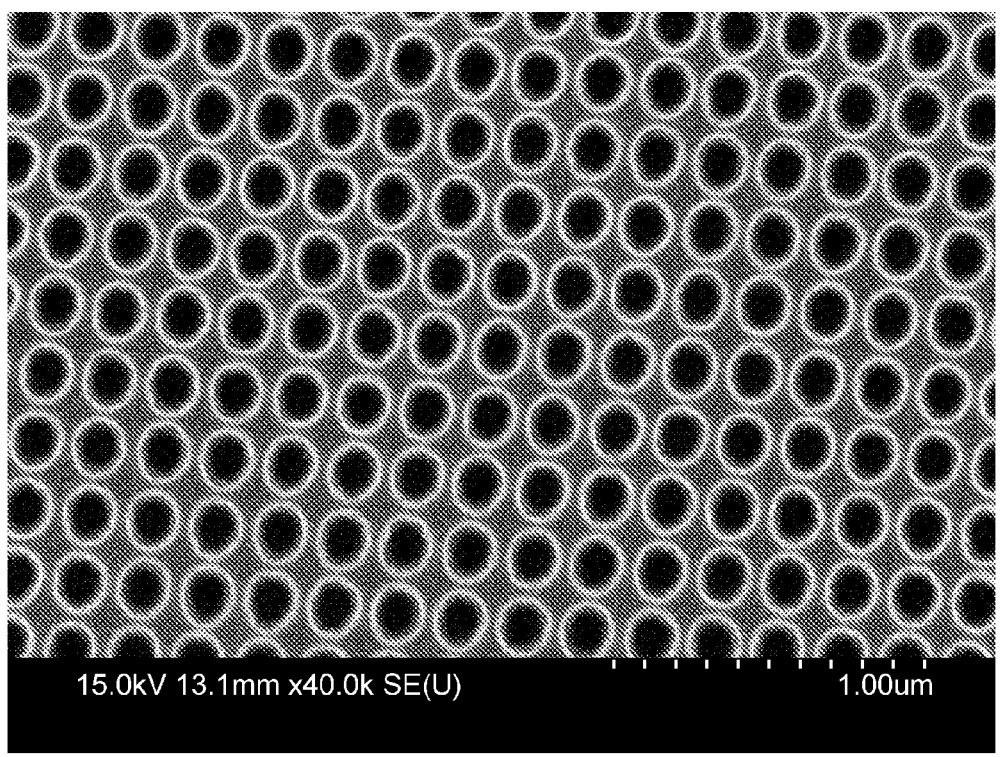
FIG. 3 is an SEM photograph of the surface of an exemplary mold in which the nano-concavities are configured as round holes. This mold can be used for nano-molding cylindrical nano-rods or nano-pillars in a nano-molded carbon electrode.
Figure 4:
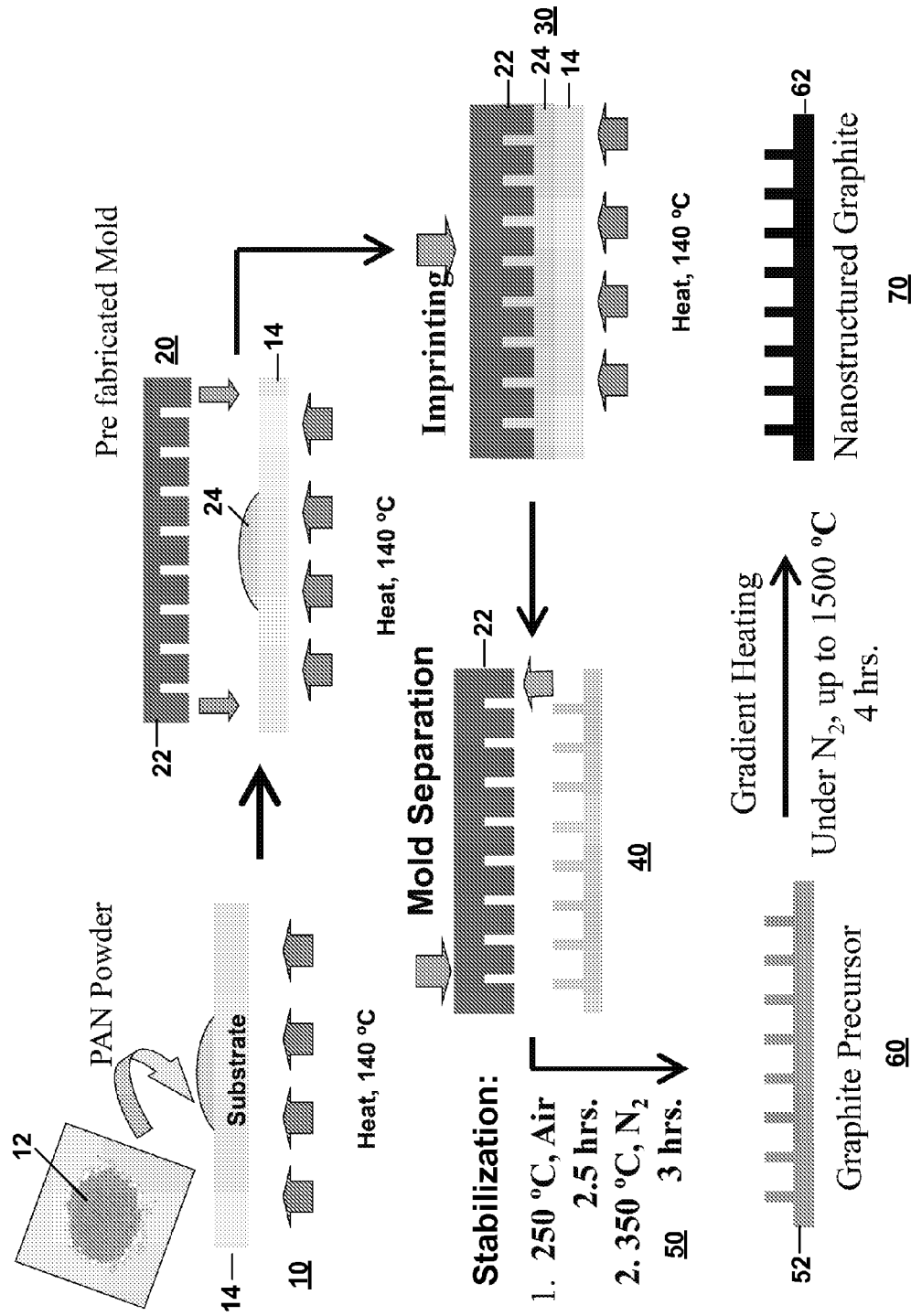
FIG. 4 is a schematic diagram of a method according to a first representative embodiment.

The "mold" (also called a "template") is a nano-patterned device used for casting nano-features onto a surface of a unit of the carbon-containing starting material (e.g., a film thereof) to form the nano-structured precursor. The mold is made of a rigid and inert material having at least one surface in which nano-sized concavities (nano-holes, for example) have been formed. Each concavity is positioned, sized, and shaped to form a corresponding nano-feature having a desired size, shape, and position relative to other nano-features of the intended nano-structure. For example, the nano-concavities can be configured to form an array of cylindrical nano-posts, nano-rods, or nano-pillars having desired diameters, lengths, and/or aspect ratios. Thus, upon the mold and unit of carbon-containing starting material being brought together, the array of nano-concavities in the mold forms a corresponding array of nano-convexities ("nano-features") on the surface of the film. In other words, the mold is used for casting at least a portion of the unit of starting material into the desired nano-features. A scanning electron microscope (SEM) image of the surface of an exemplary mold is shown in FIG. 3. In this particular mold, the nano-concavities are configured as round holes.

All known conventional fabrication techniques utilizing a template for forming nano-features of carbon or graphite employ sacrificial templates such as porous alumina film. Since these templates are sacrificial in nature, each is used only once, which is wasteful and forecloses any prospect of their use in mass-production or automated process. These techniques also require post-processing procedures (e.g., to dissolve the template) that add steps to the fabrication method, thereby increasing production costs beyond what are practical for commercial purposes. The methods disclosed herein, by repeatedly using durable molds capable of being re-used multiple times, are highly cost-effective. Applicants are unaware of any current techniques by which forming nano-structured carbon or graphite can be performed multiple times using one mold.

A practical method for forming the mold is microlithography. Electron-beam microlithography is particularly advantageous for this purpose. Example materials from which the mold can be formed include but are not limited to silicon (Si), SiO$_2$, a mixture of Si and SiO$_2$, SiC, and nickel (Ni). Alternatively, the mold can be made of a cross-linked polymer, a glass material, or a ceramic material. The microlithography for forming nanometer-scale concavities in the surface of these materials is a well-developed technique, and these materials are sufficiently robust and rigid to allow many reuses of the molds thus formed.

Examples of nano-features formed by the mold include cylindrical (rod-shaped) and polygonal (pillars) and combinations thereof. The height of the nano-features can be selected to achieve a desired aspect ratio (ratio of height to diameter), ranging from, for example, 2:1 to 10:1 or more. The maximal achievable aspect ratio from a practical standpoint depends at least in part upon whether the nano-features in the respective precursor are sufficiently self-supporting after the mold is removed. Generally, rod-shaped or pillar-shaped nano-features exhibit good self-support and can be formed at high aspect ratios.

The pitch of the nano-concavities on the mold is not limiting, and a practical pitch usually can be achieved without difficulty. For maximal surface-area enhancement, it is desirable that the mold define the nano-features with the smallest possible pitch, such as but not limited to 200 nm center-to-center. Generally, the pitch desirably is less than the diameter of an individual nano-feature.

The mold and the carbon-containing film can be brought together in either of two basic ways. In the first way, the carbon-containing starting material is applied to or formed, as a film or other unit, on the surface of a substrate, followed by application of the mold to the material. In this first way, the starting material can be formed into a film before or as a result of application of the mold to the material. (Pre-forming the film on the substrate surface can be achieved by, e.g., spin-coating or blade-coating or simply placing a drop of the solution on the surface of the substrate.) In the second way, the starting material (or a film thereof) is applied to or formed on the nano-patterned surface of the mold. Effective techniques for forming the film on the mold surface are spin-coating and blade-casting; using either technique will achieve full penetration of the starting material into the nano-concavities in the mold. After forming the film on the mold surface, the film can be transferred from the mold to the surface of a suitable substrate. This transfer can be achieved simply by direct contact of an unpatterned surface of the film, while on the mold, to the substrate surface.

In a variation of the second way, the starting material is nano-molded between two molds facing each other, thereby forming a multiple-sided nano-structured film. In yet another variation, a first mold is used to nano-mold one side of a film, followed by nano-molding a second side of the film using a second mold or re-using the first mold.

The nano-molded film desirably is stabilized to ensure that the nano-features formed on the material can survive downstream carbonization. Especially with PAN as a starting material, stabilization can be, and desirably is, done after removing the mold. Stabilization typically involves heating to a temperature below that required for carbonization (e.g., 250-350° C.) for a defined time period. If the starting material was applied as a solution, stabilization also usually results in driving off any significant remaining solvent left in the film.

The structure remaining after nano-molding and stabilization is termed herein the "nano-structured precursor" or simply "precursor."

Conversion of Nano-Structured Precursor to Nano-Architectured Carbon Structure

The nano-structured precursor is converted to a corresponding graphite or other carbonized structure by applying a suitable condition. This process is generally called "carbonization." Carbonization requires elevated temperature. The particular temperature regimen depends upon whether carbonization is intended to form graphite or to form another form of carbon such as disordered carbon or activated carbon. Conversion to graphite involves thermal decomposition of the nano-structured precursor in an inert-gas (e.g., argon) environment at extremely high temperature (up to 2000° C. or greater, depending upon the material) for a substantial period of time (typically several hours). Conversion to activated carbon requires incubation at elevated temperature sufficient for pyrolysis to occur, but the temperature is substantially lower than required for conversion to graphite. Conversion to activated carbon is also desirably performed in an inert-gas environment; otherwise, the precursor simply burns away. Other process variables can be controlled as needed or desired.

The nano-structured precursor can be converted to a corresponding activated carbon (charcoal) structure by selective elevated-temperature oxidation in $CO_2$, water vapor, and KOH after heating the precursor in an inert atmosphere as described above. In the resulting nano-architectured activated carbon structure, the easily accessible interconnected surface area is enhanced many-fold. This enhancement is in addition to enhancement realized from the formation of the normal micropores and mesopores in activated-carbon structures.

For conversion to graphite, the heating regimen desirably involves "gradient heating." Gradient heating is a progressive increase in temperature according to predetermined schedule and under defined conditions to avoid damage to the nano-structure during its conversion to graphite. For example, gradient heating of a nano-structured PAN precursor includes a progressive increase in temperature, under an inert gas (e.g., $N_2$ or noble gas), from 350° C. to up to 2000° C. or higher temperature over a multi-hour (e.g., four-hour) time period. The highest temperature can be maintained until the desired conversion of the precursor to graphite is complete. The goal of this conversion regimen is to convert the precursor to graphite while preserving its nano-architecture.

A "graphite precursor" is a nano-structured carbon-containing precursor formulated and destined to become a corresponding graphite nano-structure under defined conditions including controlled heating at high temperature. An "activated carbon precursor" is a nano-structured precursor formulated and destined to become a corresponding activated-carbon nano-structure under defined conditions. Whether a nano-structured carbon-containing precursor can be converted to the corresponding graphite or other carbonized nano-structure from a practical standpoint depends upon the specific material of the carbon-containing precursor and, in some instances at least, of the substrate (if used). Some materials simply cannot withstand the high temperatures required for conversion to graphite.

The "active" surface area (available for intercalation) of nano-structured graphite is proportional to $n^2$, where n is the aspect ratio of the nano-structures. Nano-structured graphite in a subject device, such as an electrode, is distinctive because there is no known current technology that can create a nano-structured surface of bulk graphite from a nano-structured precursor. Nano-structured graphite produced by the subject methods is useful in, for example, electrodes for various applications such as but not limited to Li-ion batteries and supercapacitors.

Forming the carbonized nano-structures on a rigid substrate may be particularly advantageous for certain uses such as many battery configurations. Forming the nano-structures on a flexible substrate may be particularly advantageous for other uses such as in supercapacitors.

Nano-structuring carbon electrodes as described herein is an effective way to enhance their surface area. Also, upon activation, these electrodes provide superlative control and access to the interconnected mesopore network of the carbon. By nano-molding alone, a large enhancement in specific surface area is achieved. The enhancement factor due to nano-structuring can be described as:

$$f \approx 1 + \pi \times \frac{n}{(1+m)^2}$$

where n is the aspect ratio (height/diameter; h/d) and m is the ratio between pitch (pillar-to-pillar distance) and pillar diameter. For example, a carbon electrode comprising nano-pillars having a diameter of 10 nm with n=10 and m=0.45 has a specific area enhancement of at least 15. Although it is simplistic to estimate the surface-area enhancement due to the presence of nano-pillars alone, other enhancement is contributed by interconnected mesopore networks already present in activated carbon. These increases in surface area can be determined using both modeling and experimental techniques.

Carbonization as performed in the methods disclosed herein produces disordered carbon as well as graphite (in the graphitization process) or activated carbon. Nano-structured disordered carbon generally has a capacity larger than that of the theoretical specific capacity of 372 mA·hr/g for graphite electrodes because of the presence of lithium ions in between the layers of disordered carbon. Currently, the high capacity exhibited by disordered-carbon electrodes is not highly beneficial because of the irreversible nature of this capacity, which is due to the inaccessibility of these ions in disordered carbon. The methods disclosed herein, in contrast, provide a high, reversible, and reproducible capacity by forming highly accessible increased surface areas by nano-structuring.

First Representative Embodiment

This embodiment is of a method for producing a nano-structured carbon-containing precursor, which is converted to a corresponding nano-architectured carbonized structure. Referring to FIG. 1, the method begins 10 with application of a selected amount of comminuted ("powder") 12 of polyacrylonitrile (PAN) to the surface of a substrate 14, such as an electrode substrate. The applied PAN is in a molecular form that can be fluidized and is an example of a carbon-containing starting material. During or following application of the powder 12, the substrate temperature ("heat") is adjusted to a range in which the PAN granules are cyclized to a small extent. By way of example, the heat is denoted as 140° C. in the figure. The particular temperature is selected to achieve a desired degree of cyclization of the PAN sufficient for nano-molding the PAN using a mold 22. In other words, in this embodiment the heat temperature is adjusted so that the PAN is fluidized sufficiently to flow between the mold and the substrate while achieving full penetration of the PAN into the nano-concavities on the mold surface. In section 20 the mold 22, which is prefabricated, is brought into contact with the surface 24 of the fluidized PAN, causing the PAN to spread over the surface 24 and fill the nano-concavities in the mold 22. As a result, the surface of the PAN is nano-molded by the mold 22 (section 30). After completion of nano-molding in section 30, the temperature is increased to about 250° C. for a time sufficient for PAN molecules to cyclize completely (see section 50). Cyclization stabilizes the PAN. If stabilization is performed before removing the mold, the PAN is ruggedized sufficiently to allow separation (section 40) of the mold 22 from the PAN surface. The resulting structure is a "carbonization precursor" 42. In the depicted embodiment, section 50 (stabilization) includes incubation at 250° C. for 2.5 hours in air, followed by incubation at 350° C. for three hours in an inert-gas ($N_2$) atmosphere. Stabilizing the carbonization precursor and removing the mold result in formation of a "graphite precursor" 52 (section 60). In section 70 of the figure, the graphite precursor 52 is incubated at a temperature up to 1500° C. in an inert atmosphere for four hours or as required to transform the carbon/graphite precursor 52 to a corresponding nano-architectured graphite structure 62. Incubation above 600° C. drives off substantially all the heteroatoms (atoms other than C). If incubation in section 60 were at about 600° C., then activated carbon would be formed instead of graphite.

Figure 5:
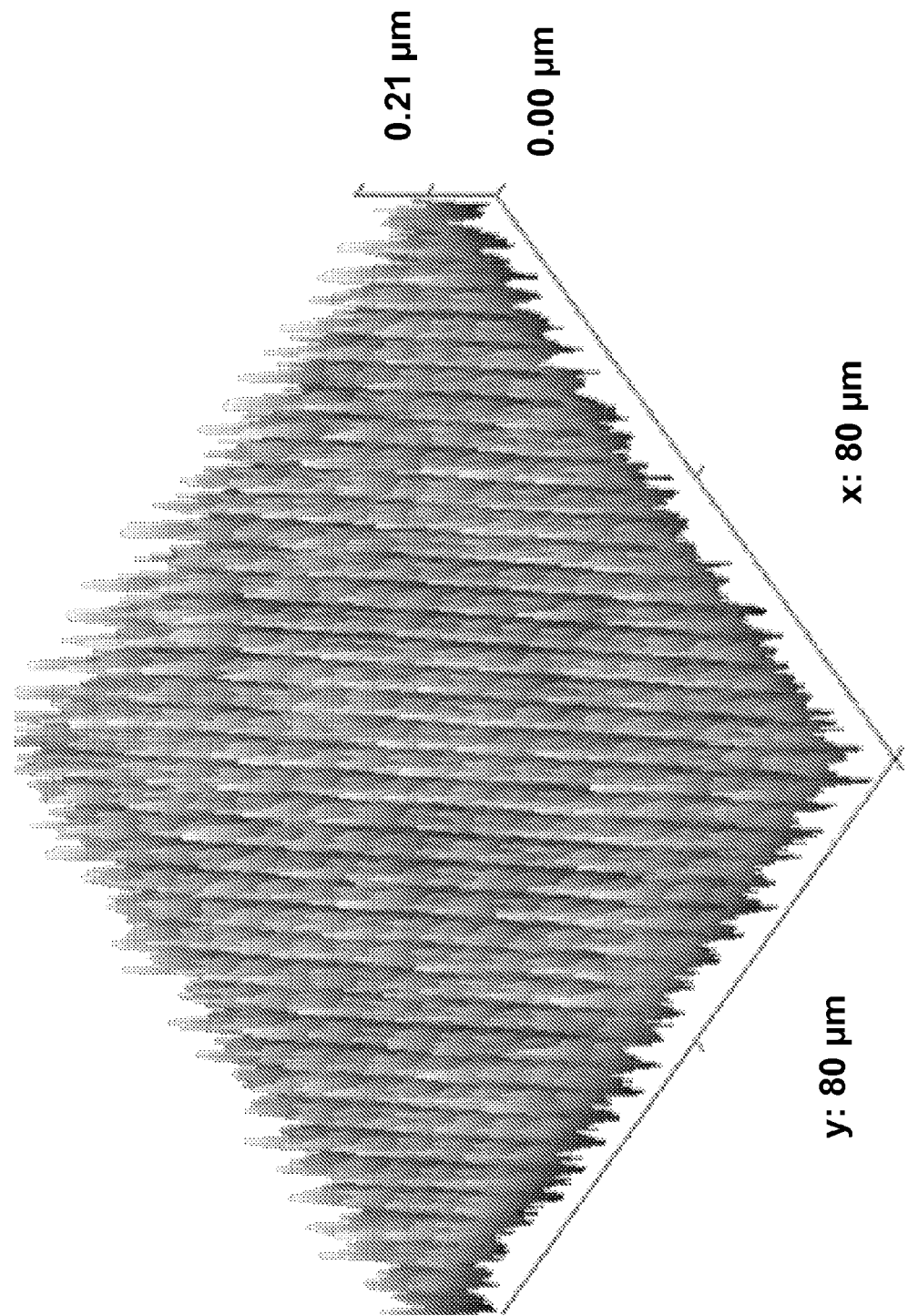
FIG. 5 is a perspective view of an exemplary array of nano-rods molded on a pristine PAN film.
Figure 6:
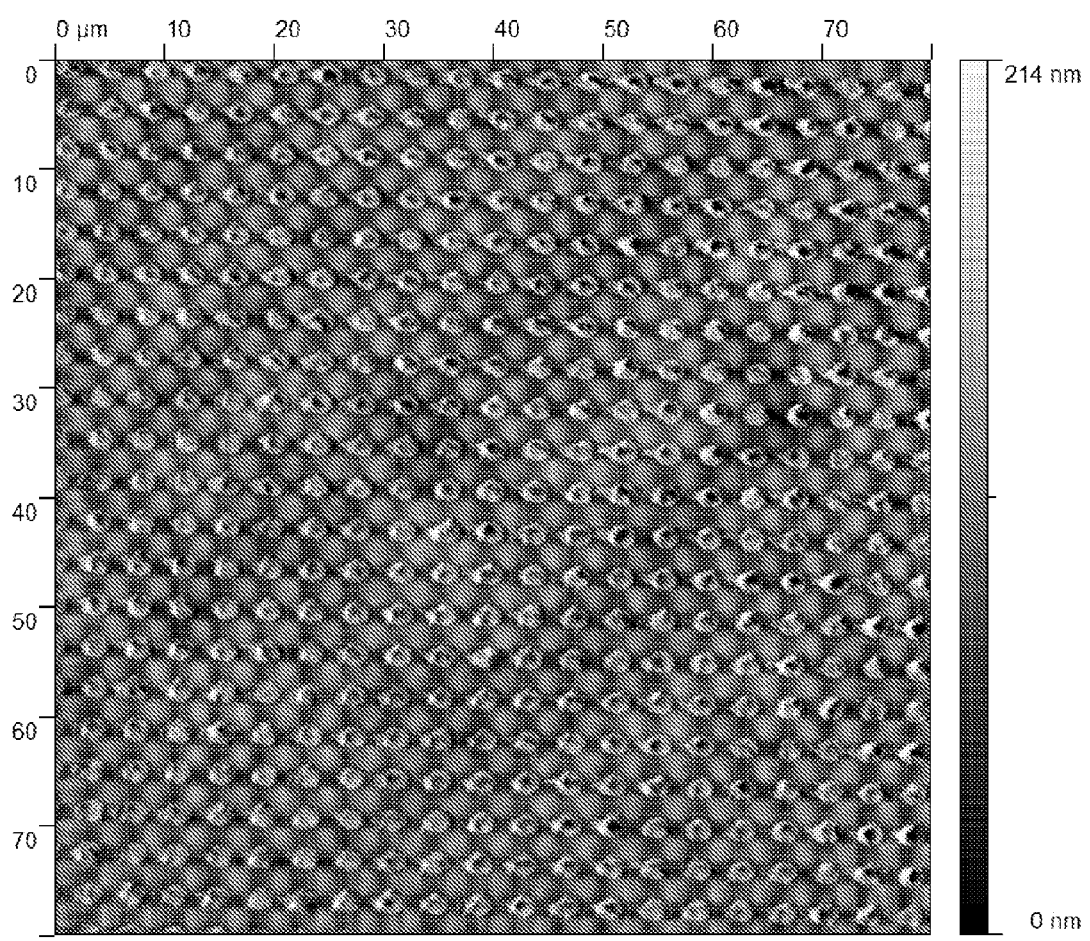
FIG. 6 is a view of a portion of the array shown in FIG. 5.
Figure 7:
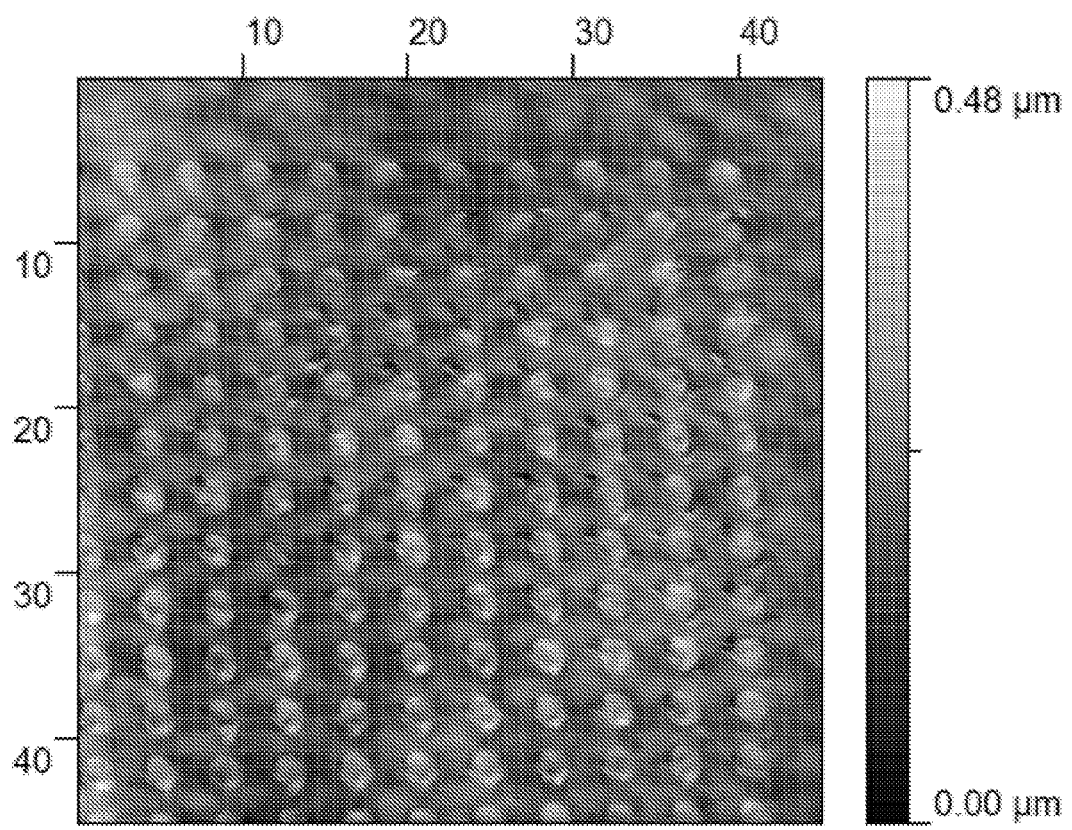
FIG. 7 is an atomic-force microscopy (AFM) image of the array shown in FIG. 6.

Reference is now made to FIG. 5, which is a perspective view of an exemplary array of nano-rods formed on a pristine PAN film according to this embodiment, as imaged by atomic force microscopy (AFM). Each nano-feature in this array is shaped as a cylinder, but appears artifactually as a spike in this AFM image. Note the 80×80 μm in the x-y plane and the mean height of 0.21 μm. The aspect ratio is 1.5, and the pitch is approximately 17 nano-rods per 70 μm=0.24 nano-rods/μm. FIG. 6 provides a plan view of this array, obtained as a contact-mode AFM image. FIG. 7 is another plan AFM image of a 35×35 μm region, in which the mean height of nano-rods is ~100 nm, the mean diameter is 1.5 μm, and the pitch is ~3 μm. Actual heights of the nano-rods can be understood from the color bar on side of the image.

Second Representative Embodiment

Figure 8:
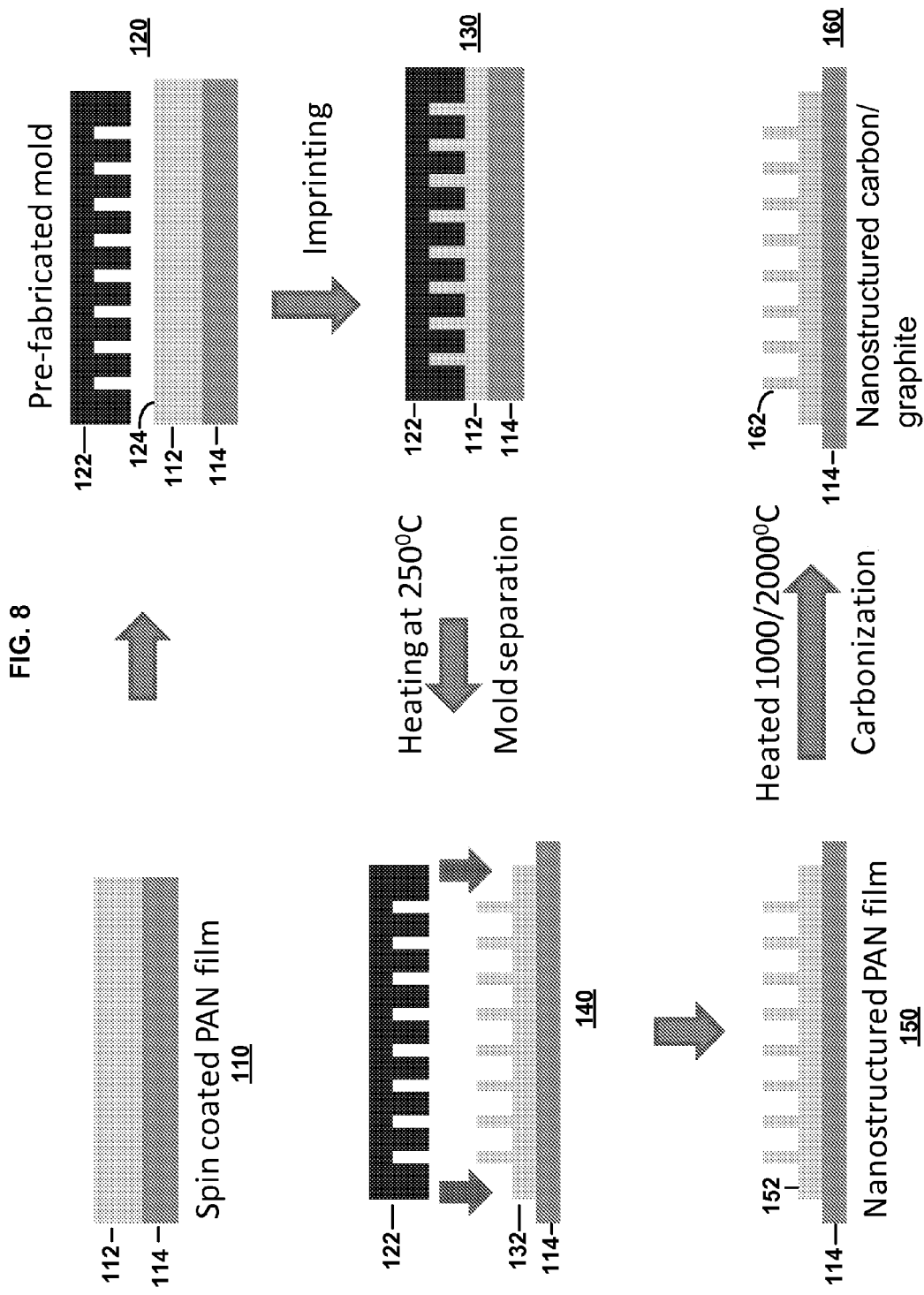
FIG. 8 is a schematic diagram of a method according to a second representative embodiment.

This embodiment, diagrammed in FIG. 8, is similar to the first representative embodiment, except that the PAN starting material is applied, as a fluid, on the surface of the mold. Application is performed by spin-coating or blade-coating. The method begins (section 110) with application of a selected amount of fluidized PAN 112 (dissolved in a solvent such as dimethylformamide) to the surface of a substrate 114, such as an electrode substrate. This application can be performed at room temperature. The degree to which the PAN is fluidized is controllable by appropriately adjusting the concentration of PAN in the solvent, and desirably is selected to be sufficient for nano-molding the PAN using a mold 122. Thus, the PAN is fluidized sufficiently to flow between the mold 122 and the substrate 114 while achieving full penetration of the PAN into the nano-concavities on the mold surface. In section 120 the mold 122, which is prefabricated, is brought into contact with the surface 124 of the PAN, causing the PAN to spread over the surface 124 and fill the nano-concavities in the mold 122. As a result, the PAN is nano-molded by the mold 122 (section 130). After completion of nano-molding 130 the temperature of the mold 114 is increased (to 250° C. in the figure) to stabilize the PAN 132. This stabilization condition also drives off most of the solvent, which results in minor shrinkage of the PAN. This shrinkage is actually beneficial because it allows the mold to be removed easily without damaging the nano-features. The mold 122 can now be used to nano-mold another PAN layer. In section 150 the structure 152 is a nano-molded carbonization precursor. In section 160 of the figure, the precursor 152 is incubated at a temperature up to 1000° C. in an inert atmosphere to transform the precursor to correspondingly nano-structured, activated carbon 162. Alternatively, the precursor 152 is incubated at a temperature above 2000° C. in an inert atmosphere to transform the precursor to correspondingly nano-structured graphite.

Third Representative Embodiment

Figure 9:
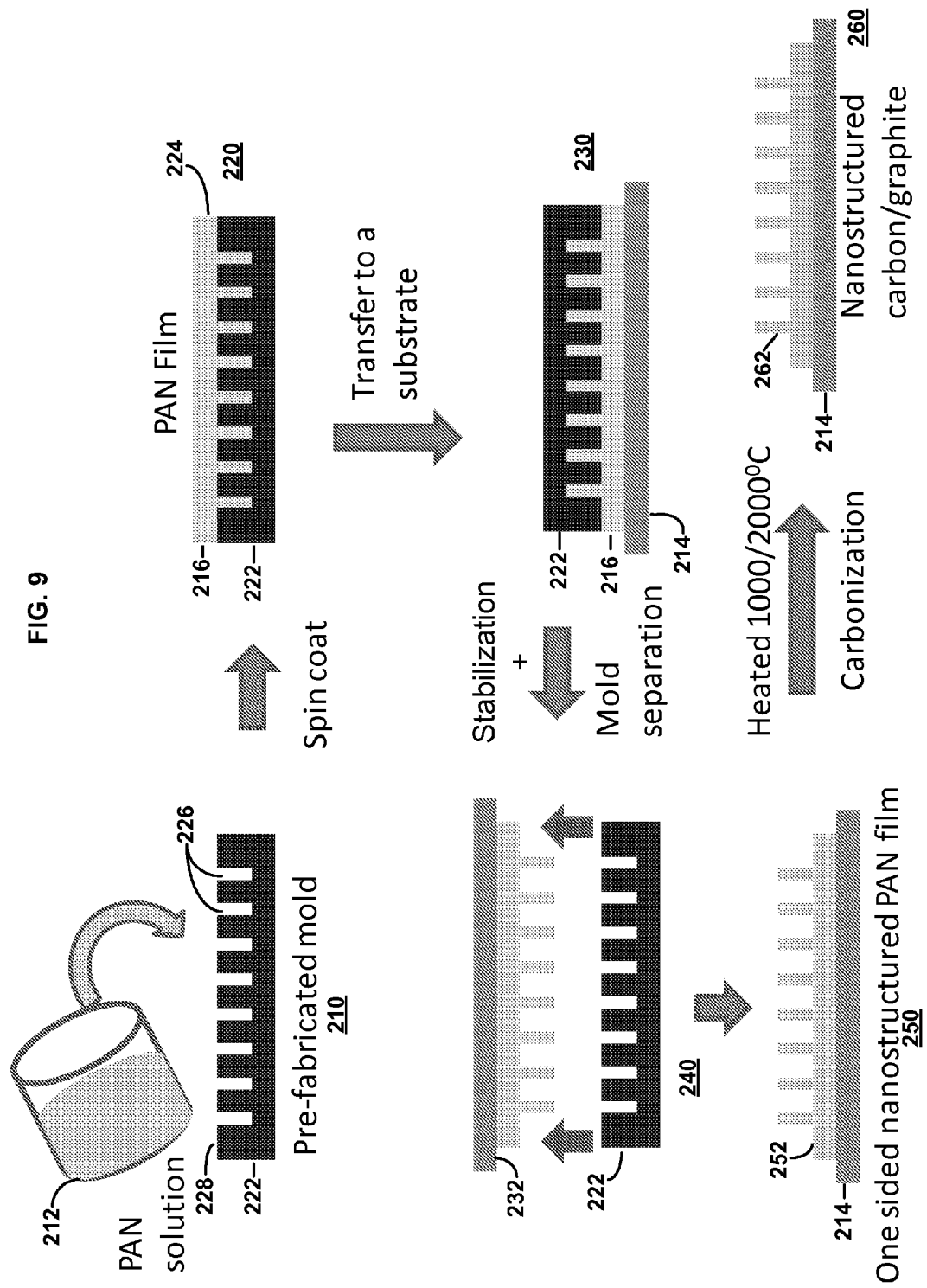
FIG. 9 is a schematic diagram of a method according to a third representative embodiment.

This embodiment, diagrammed in FIG. 9, is similar to the second representative embodiment, except that the PAN starting material is applied, as a fluid, to the surface of a prefabricated mold 222 rather than on a substrate. Application of PAN desirably is performed by spin-coating or blade-coating. The method begins 210 with application of a selected amount of fluidized PAN 212 (dissolved in a solvent) to the surface of the mold 222, which is pre-formed with desired nano-concavities 226. This application can be performed at room temperature. The PAN 212 is fluidized sufficiently to flow over the mold surface 228 while achieving full penetration of PAN into the nano-concavities 226 (section 220). Consequently, in structure 224, the PAN film 216 is nano-molded by the mold 222. In section 230 the non-molded surface of the PAN film is transferred to a substrate 214, such as an electrode substrate. The mold 222 is removed 240 before the PAN is stabilized. The released mold 222 can now be used to nano-mold another PAN layer. In section 250 the resulting structure 252 is a one-sided nano-structured carbonization precursor. In section 260 of the figure, the precursor 252 is incubated at a temperature up to 1000° C. in an inert atmosphere to transform the precursor to correspondingly nano-structured carbon 262. Alternatively, the precursor 252 is incubated at a temperature above 2000° C. in an inert atmosphere or under vacuum to transform the precursor to correspondingly nano-structured graphite.

Fourth Representative Embodiment

Figure 10:
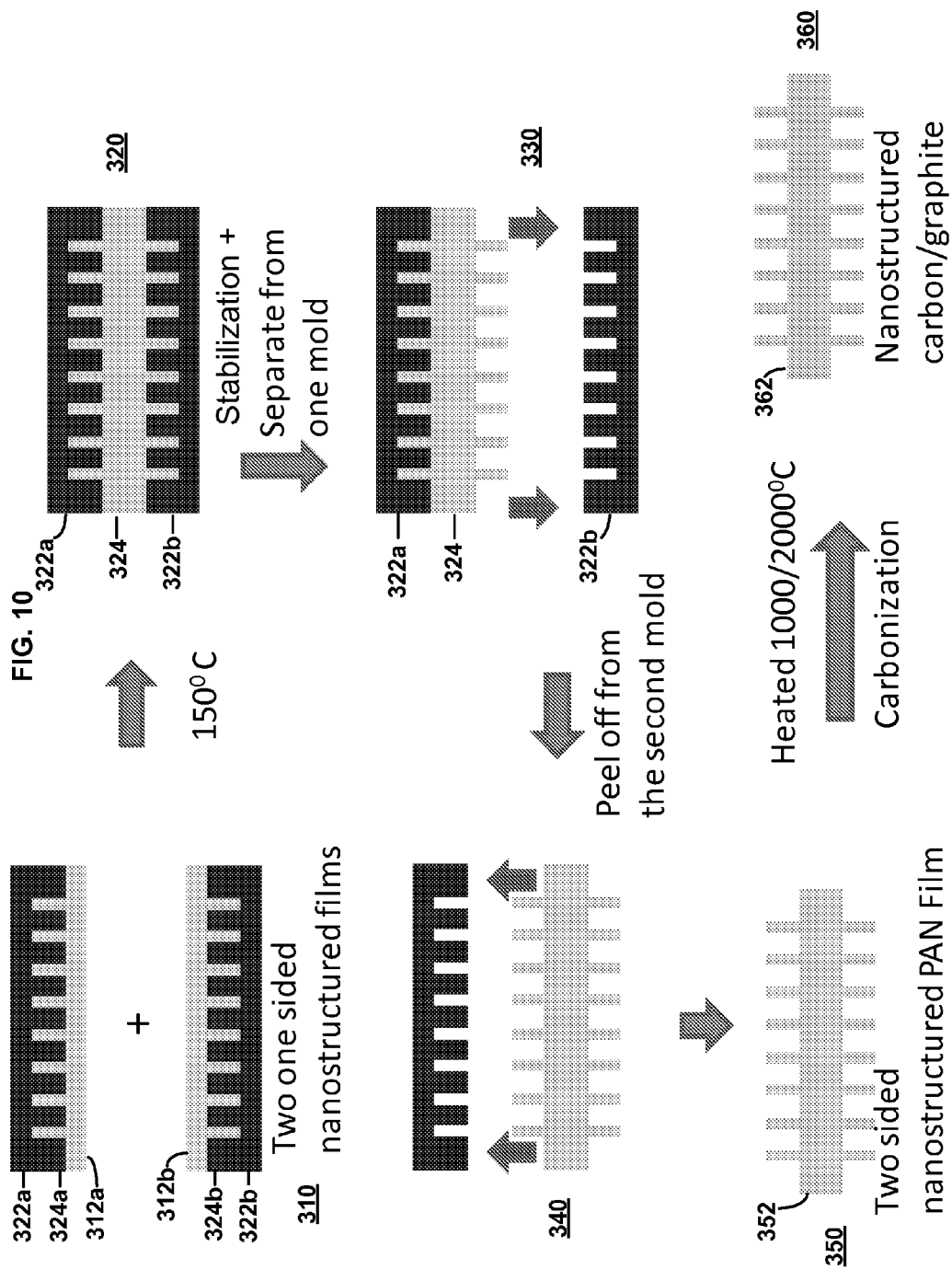
FIG. 10 is a schematic diagram of a method according to a fourth representative embodiment.

This embodiment is shown in FIG. 10, and is directed to the formation of a two-sided nano-architectured carbon structure. This method begins with two structures 224a, 224b similar to the structures 224 formed in section 220 of the third representative embodiment. The non-molded surfaces 312a, 312b are brought together back-to-back at room temperature or at a temperature of less than 150° C., before the PAN is stabilized, to form an integral, two-sided nano-molded PAN film 324 situated between the molds 322a, 322b (section 320). In section 330, after PAN stabilization, one mold 322b is removed. In section 340, the other mold 322a is removed. The released molds 322a, 322b can now be used to perform further nano-molding. The resulting structure 352 is a two-sided nano-structured carbonization precursor. In section 360 of the figure, the precursor 352 is incubated at a temperature up to 1000° C. in an inert atmosphere to transform the precursor to correspondingly nano-structured, activated carbon structure 362. Alternatively, the precursor 352 is incubated at a temperature up to 2000° C. in an inert atmosphere to transform the precursor to correspondingly nano-structured graphite. The structure 362 is free-standing and can be used without a supporting substrate.

The products of the embodiments described above can be used as-is, free-standing or attached to a substrate, e.g., for carbon electrodes in any of various devices. Free-standing structures formed, for example, in the fourth embodiment are also usable as-is, such as in supercapacitors.

An attractive advantage of a nano-architectured electrode made by the subject methods is that it is not required to develop or alter existing technology used for battery-electrode or capacitor-electrode fabrication. The implementation is easy since, for example, the existing graphite electrodes in lithium ion batteries can simply be replaced by a nano-architectured graphite electrode to accomplish higher efficiency.

Fifth Representative Embodiment

To increase the energy density in a nano-structured carbon electrode for a lithium battery, an electrode according to this embodiment comprises doped carbon. As a suitable dopant, the electrode can comprise, for example, carbonized PAN including Si nano-particles, made from PAN preloaded with Si nano-particles. In one example, calculations revealed that an electrode made from PAN loaded with 75% w/w Si nanoparticles had a specific capacity of 582 mA·h·g$^{-1}$ from the nano-pillars alone, not considering the specific capacity of the carbon base layer from which the nano-pillars extended. The capacity from the nano-pillars is available for fast charging and discharging. In this example, nano-pillar dimensions considered in the calculations were: diameter=250 nm, height=600 nm, and pitch=300 nm.

In another example we formed sub-100-nm nano-structures having aspect ratios of five or more (which can further increase the specific capacity). In another example, we produced nano-structures from PAN doped with Si nano-particles (40% w/w). These structures exhibited great promise for use in battery electrodes for fast-charging Li-ion batteries and hybrid-supercapacitor devices.

Figure 13:
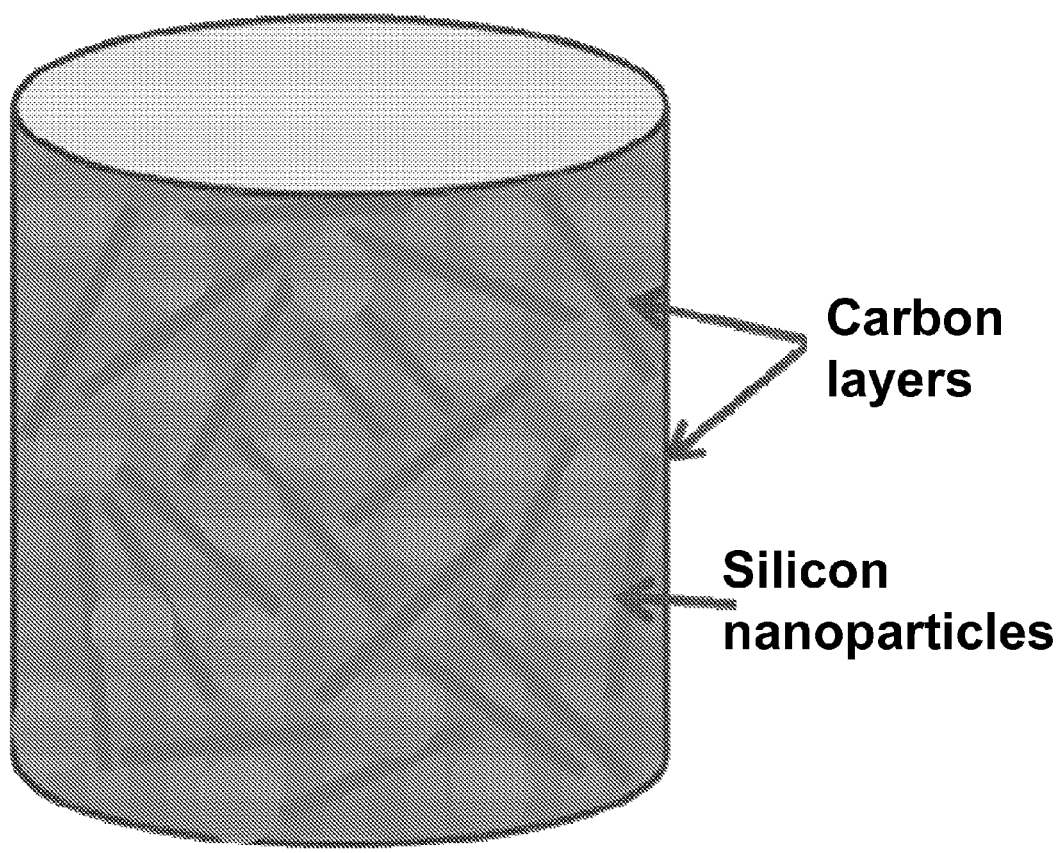
FIG. 13 is a schematic depiction of a single nano-pillar, according to another embodiment, comprising nano-architectured carbon doped with silicon nano-particles.

A schematic depiction of a single nano-pillar comprising silicon nano-particles doped between the carbon layers thereof is shown in FIG. 13.

Figure 14:
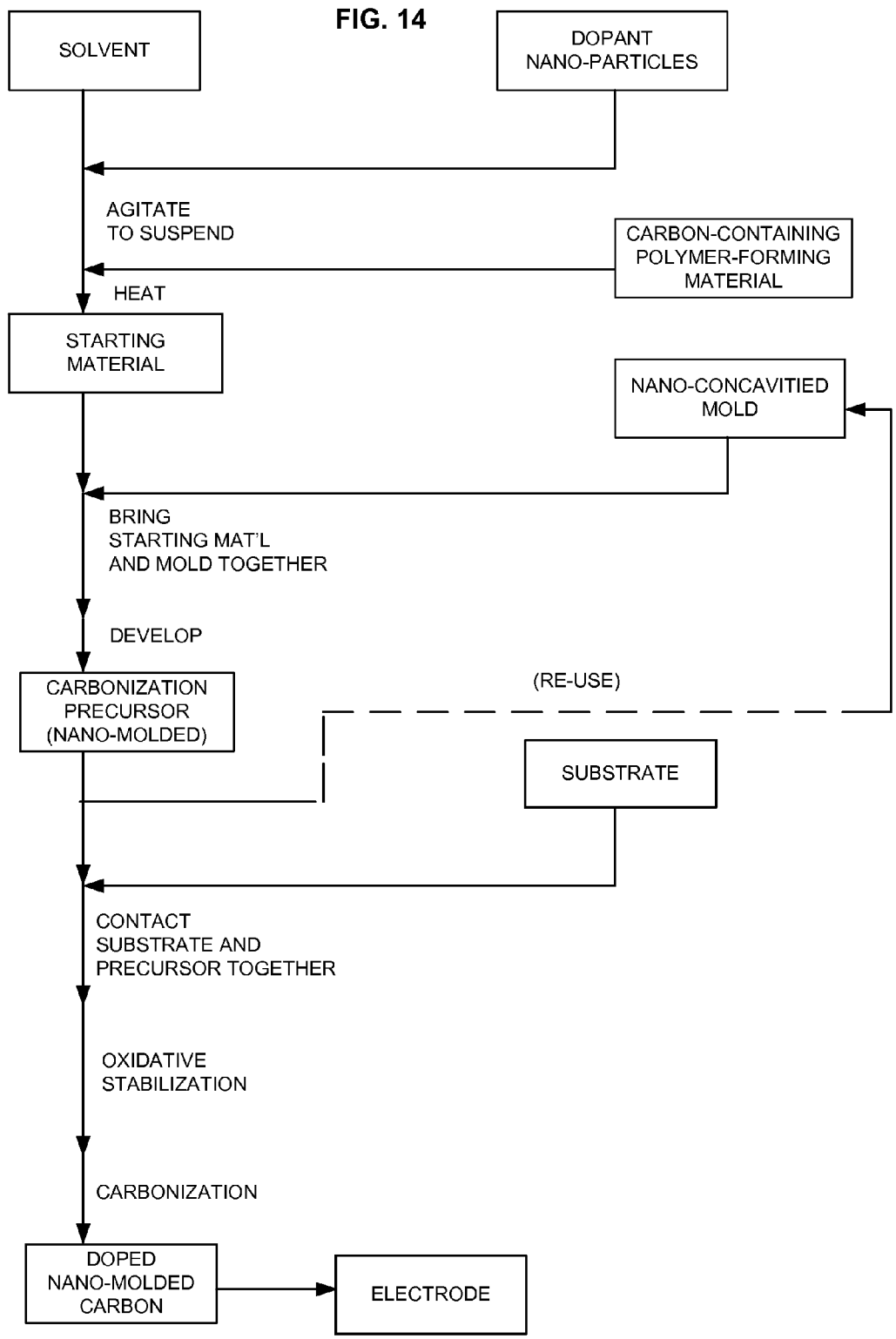
FIG. 14 is a flow diagram of an embodiment of a method for fabricating doped nano-molded carbon, particularly for use as electrodes, as described in the fifth representative embodiment.

Reference is now made to FIG. 14, which is a flow-diagram of an embodiment of a method for making doped nano-architectured carbon structures, particularly for use as electrodes. The electrodes can be used as, for example, high-capacity electrodes having fast charging rates. In an example of the method, Si nano-particles are used as a dopant. A substantially similar method can be used to produce nano-structured carbon electrodes doped with any substance useful for the performance of the electrodes and that can survive the process conditions (unless the material is intended to be consumed during the process).

The process begins with addition of a desired amount of dopant to a solvent. The solvent is appropriate for the carbon-containing polymer-forming material to be used as a starting material. For example, a desired amount of Si nano-particles is added to the solvent dimethylformamide (DMFA), which is a good solvent for PAN. Hence, this suspension is used as a solvent for dissolving PAN to achieve a desired concentration of both PAN and the Si nano-particles in the carbonization precursor. Loading of the Si nano-particles in PAN can be optimized, based on, for example, ease of processability, fidelity of the nano-structures to be formed, and desired specific charge capacity of the electrodes to be formed. In many instances, maximum loading of dopant is desired. For example, "maximum" loading of Si nano-particles in DFMA can be 70% w/w or more (e.g., 75%). The resulting suspension is agitated (e.g., sonicated) to achieve complete and uniform suspension of the nanoparticles in the solvent. To the suspension is added the desired amount of carbon-containing polymer-forming material, e.g., PAN. The polymer-forming material forms a solution thereof in the solvent, with the dopant particles remaining suspended in the solution. The solution/suspension is heated to 150° C. for several hours to encourage limited polymerization of the PAN and thus form a starting material.

Meanwhile, a desired nano-concavitied mold is provided, in which the nano-concavities define the arrangement, size, and shape of nano-features to be cast into the starting material. For nano-molding, the starting material and mold are brought into contact with each other. For example, the starting material is cast onto the nano-concavitied surface of the mold by spin coating or blade casting, which forms a film of the mixture (solvent, PAN, and dopant) on the mold and results in formation of the nano-features on the surface of the film. In this embodiment the nano-molded film is transferred from the mold to a substrate (nano-imprinted side up). Thus, the mold can be returned upstream to be used again.

The nano-imprinted film is heated to achieve oxidative stabilization. For example, with a maximally Si-doped PAN/DMFA starting material, oxidative stabilization is performed at 250° C. for 2 to 4 hours. Carbonization is then performed at high temperature. In the example, the nano-imprinted film on the substrate is heated above 600° C. to achieve carbonization. Carbonization converts the molded nano-features on the film to corresponding carbon nano-structures that are loaded with Si nano-particles.

The specific capacity of an electrode made according the process described above is much higher than an otherwise similar electrode made without the Si nano-particle dopant. The higher capacity achieved with the doped electrode is due to the high specific capacity of silicon. The volume change accompanying lithium intercalation in silicon is well accommodated since the Si nano-particles are situated between carbon "layers." The carbon layers also provide improve electrical connectivity.

As will be appreciated from the foregoing, the method generally described above is easy to perform and can be used to produce, for example, high specific-activity electrodes of substantially any size and shape and that exhibit fast charge/discharge rates that are enhanced by the presence of dopant. The method can be used to produce nano-architectured carbon electrodes doped with any material that is useful for the performance of the electrodes.

Representative Devices Comprising Nano-Architectured Structures

Representative "electrically active" devices include, but are not limited to, the following:

(1) Lithium-ion batteries: The most promising battery technology for electric vehicles today is the lithium-ion ("Li-ion") battery, which has excellent open-circuit voltage (3.6 V). Conventional Li-ion batteries have an energy-density twice as high as that of NiCad batteries. In addition, Li-ion batteries are relatively free from the memory effect and are environmentally friendlier. The promise of Li-ion battery technology is evidenced by, for example, the number of automakers currently announcing joint development and manufacturing ventures with established Li-ion power-device manufacturers.

Li-ion batteries, discussed earlier above, use graphite electrodes as anodes. The charging rate, working hours, and power densities of Li-ion batteries largely depend on the active surface area and porosity of the graphite. The larger active surface area provided by a nano-structured graphite electrode in such a battery facilitates the production of a more miniaturized battery, faster charging time of the battery, and larger power storage in the battery.

In a conventional graphite-based electrode (as an anode for a Li-ion battery), each lithium ion can intercalate with six carbon atoms, to give a theoretical specific capacity of 372 $mA \cdot h \cdot g^{-1}$ (mA-hr per gram). However, no practical case is known heretofore in which the capacity has reached close to this value except perhaps in conventional, extremely thin graphite electrodes. By nano-structuring the graphite of the electrode as described herein, thereby producing a substantial increase in surface of the electrode, it is believed that capacities close to theoretical are achievable (as well as increases in charge/discharge rate), even with thick carbon films. This is not because of the increase in the theoretical capacity but because of better accessibility of lithium ions to the intercalation sites. The theoretical value is not strictly valid for disordered carbon because, in such material, there are lithium ions "staying" in between the disordered-carbon layers that increase the number of lithium ions incorporated into the electrodes. Other factors underlying achievable enhancement of capacity using nano-architectured carbon electrodes as described herein are, inter alia: (a) better accommodation of strain arising from the insertion/removal of lithium ions, (b) shorter path-lengths for lithium-ion transport, and (c) shorter path-lengths for electronic transport.

(2) Hydrogen Storage: Molecular hydrogen has been predicted as a near-future source of energy for transportation vehicles (e.g., automobiles and aircraft). Nano-structured graphite as described herein is a tunable and efficient storage medium for gaseous hydrogen.

(3) Supercapacitors: Supercapacitors are similar to batteries in configuration but provide higher power and longer cycle life. A supercapacitor works on the basis of accumulation of electrostatic surface charge in an electrode(s) thereof. Hence, a nano-structured carbon electrode is advantageous in a supercapacitor.

A supercapacitor can work either as a stand-alone energy-storage device for high-power needs or as part of a hybrid battery-supercapacitor hybrid device (see below) that can address both power and energy requirements. Supercapacitors are used in highly demanding power-backup and energy-storage systems for telecommunications, power generation and distribution industries, hybrid-electric and all-electric vehicles, providing high power density and long lifetime for portable electronics, and meeting the high peak-power and energy demands in industrial and military equipment, ships, and submarines. The faster charge-discharge capabilities of supercapacitors are particularly advantageous for hybrid-electric vehicles where energy can be captured by supercapacitors from regenerative braking of the vehicle.

Nano-structured carbon electrodes, as described herein, are useful in a supercapacitor. Relevant characteristics in this regard include: (1) The high surface area and tight pore-size distribution (e.g., <1 nm) in the nano-features (e.g., sub-20 nm nano-pillars), as well as in the bulk carbon situated beneath the nano-features, provide extremely fast charging of the supercapacitor (<<10 seconds). (2) The absence of a binder on the electrodes confers high electrical conductivity, assuring achievement of high power density. (3) The presence of large surface functionalities that can undergo fast redox reactions enhances the capacitance through a pseudo-capacitive process if working in aqueous electrolytes.

(4) Battery-Capacitor Hybrid Devices:

A battery, which relies upon chemical reactions to store and deliver power, typically requires a relatively long charge time compared to a capacitor. A capacitor, which does not rely upon a chemical reaction to store electrical power, can store charges essentially as quickly as the charges can be delivered to the capacitor. Also, with substantially no chemical reactions with which to contend, a capacitor theoretically can be charged and discharged an unlimited number of times. Despite these apparent benefits enjoyed by capacitors, the length of time in which a capacitor can remain charged tends to be less than in many batteries. This is because maintenance of charge is limited by the type and amount of dielectric in the capacitor. The dielectric keeps the opposing charged plates in the capacitor electrically isolated from each other. Existing dielectrics simply are not capable of supporting a large charge difference between the plates for substantial lengths of time. These factors have fueled the quest for practical battery-capacitor hybrid devices that provide the benefits of both capacitors and batteries. For example, a battery-capacitor hybrid provides both high power density (as a capacitor) and high charge density (as a battery). Many battery-capacitor hybrids can be charged more rapidly than a battery, can hold more charge than a battery, can have a charge lifetime on the order of a battery, and can release charge to a load in the manner of a battery.

Therefore, a battery-capacitor hybrid represents a combination of a high-rate-conversion reaction anode (Li-alloying anodes), as used in Li-ion batteries, with the positive electrode of a supercapacitor, thereby bridging the gap between the respective performances of Li-ion batteries and supercapacitors. The hybrid device performs as a high-energy source in the manner of a battery and a high-power source in the manner of a supercapacitor, and can provide a stable performance at least for more than 30,000 charge-discharge cycles. This electrode combination also offers possibilities of increasing cell voltage, thereby further contributing to improvement in energy and power density.

Figure 11:
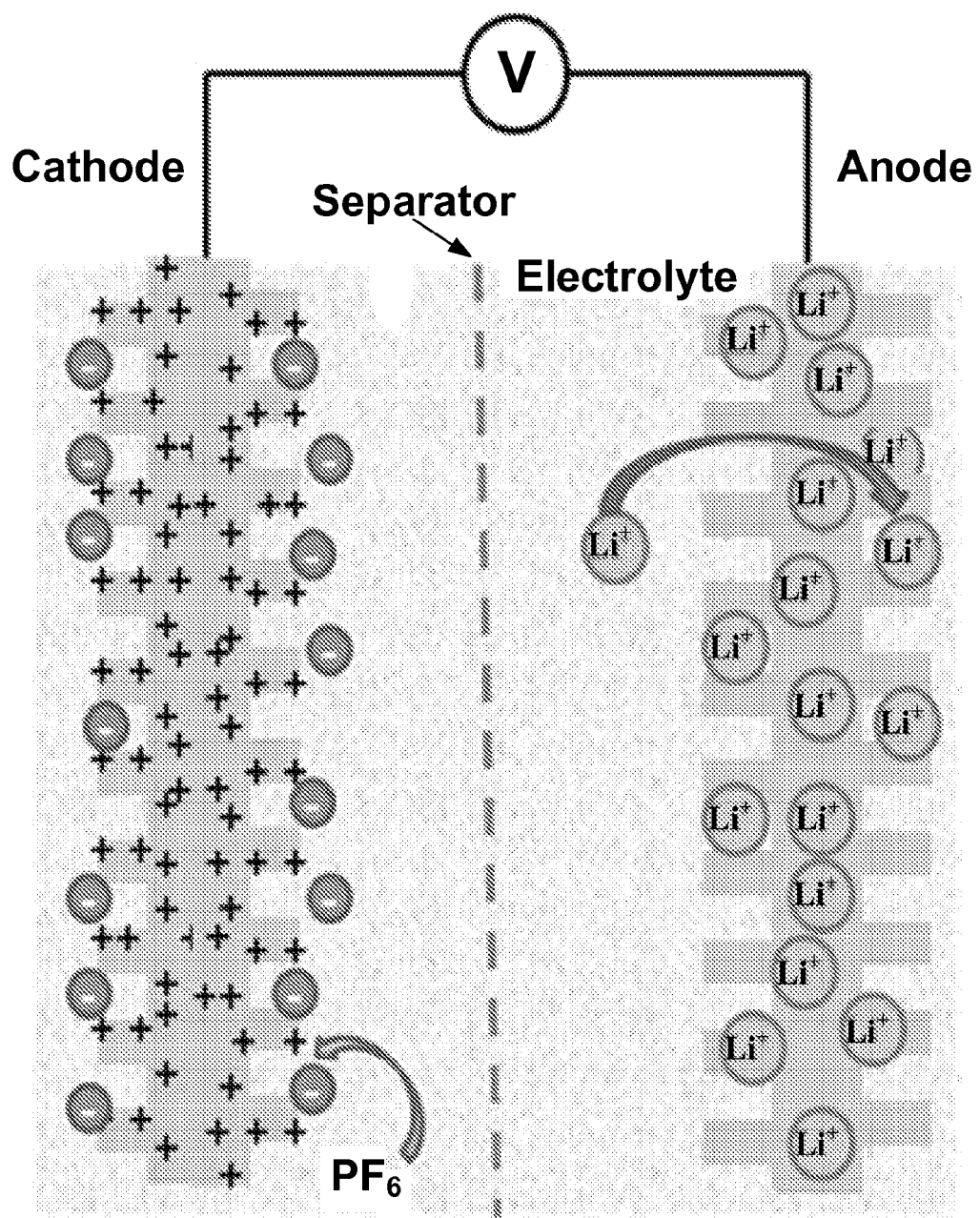
FIG. 11 is a schematic diagram of a battery-capacitor hybrid device including at least one nano-architectured carbon electrode as described herein.

An embodiment of a battery-capacitor hybrid comprises two electrodes (see FIG. 11). The cathode, on the left in the figure, is a double-sided (one on each surface of the electrode substrate) activated-carbon nano-structured electrode.

The anode, on the right in the figure, is also a double-sided electrode comprising nano-molded activated carbon. The nano-structure of the anode is in the form of nano-pillars or nano-rods. The anode and cathode are situated in a Li-containing electrolyte (also comprising $LiPF_6$) and separated from each other by a separator that has been surface-treated to render it inert. Both electrodes are formed and nano-structured by the nano-molding method disclosed herein. Even though lithium ions intercalate in these electrodes, the intercalation occurs mainly in their nano-pillars, in contrast to a conventional Li-ion battery electrode (lacking nano-features) in which intercalations occur over the surface of the electrode. As a result of the electrodes' high surface areas, provided by the nano-structure that are available for Li-ion intercalation, charging and discharging of the electrodes are very fast, thereby providing high energy density.

The nano-structured activated carbon in the cathode is prepared by carbonizing nano-molded, carbon-containing polymer films. Pyrolysis of the carbon-containing polymer film is performed in an inert atmosphere, followed by selective oxidations in $CO_2$, water vapor, and KOH to increase the surface area and pore size of the activated carbon.

For making the anode, a carbonaceous material such as activated carbon or graphite is highly desirable from an energy point of view because these materials intercalate lithium ions at voltages close to −3 V. In this embodiment the anode utilizes a Faradaic intercalation reaction to store charges.

In this embodiment a non-aqueous electrolyte is preferred over an aqueous electrolyte because the non-aqueous electrolyte provides better voltage stability. This stability allows operation at a higher voltage window, typically 0 to 2.75 V, which provides improved energy density compared to an aqueous electrolyte. In this embodiment, the capacity of the electrolyte is balanced to the respective capacities of the cathode and anode. Example non-aqueous electrolytes are $LiPF_6$ (176 mAh/g) and $LiBF_4$ (286 mAh/g).

An alternative electrolyte is an ionic liquid, which is solvent-free. Ionic liquids are salts that are in a molten state at room temperature. The liquids are composed entirely of cations and anions. The liquids have very low vapor pressure, high thermal stability, wide electrochemical windows, and good conductivity at room temperature. The various ionic liquids can be prepared using simple chemistry and physical mixing. Also, their chemical and electrochemical properties are "tunable" by adding appropriate respective ingredients to them or adjusting relative concentrations of ingredients.

(5) Moderator rods: High-purity synthetic graphite is used in moderator rods and reflectors in nuclear reactors. Their suitability arises from their low absorption/reflection capacity of neutrons, high thermal conductivity and strength at high temperature. Nano-structured graphite, formed as described herein, can be used to construct these rods with reduced size but with larger surface area. Also, the aspect ratio of the nano-structures can be suitably tuned to control the reflection/absorption of neutrons, which is impossible with conventional moderator rods.

It will be understood that the scope of "electrically active" devices also includes electrodes and the like used in any of, for example, the devices discussed above.

Whereas the invention has been described in connection with various representative embodiments, it will be understood that it is not limited to those embodiments. On the contrary, it is intended to cover all alternatives, modifications, and equal limits as may be included within the spirit and scope of the invention as defined by the appended claims.

What is claimed is:

1. A method for fabricating a nano-architectured doped carbon structure, comprising:
    preparing a carbon-containing starting material including at least one dopant;
    wherein preparing the carbon-containing starting material comprises preparing a suspension of nano-particles in a solvent for a polymerizable carbon-containing substance, and adding the carbon-containing polymerizable substance to the suspension;
    nano-molding a surface of the starting material, using a durable mold pre-formed with a pattern of nano-concavities corresponding to a desired patterned array of nano-pillars to be formed by the mold on the surface, by bringing together the surface of the starting material and the pattern of nano-concavities without applying pressure;
    removing the solvent;
    when the nano-pillars formed by the mold on the surface of the starting material have reached at least a threshold level of self-supportability, non-destructively separating the mold and the nano-pillars from each other to form a carbonization precursor having a nano-pillar molded surface; and
    carbonizing the precursor to form a corresponding array of nano-architectured carbon nano-pillars having diameters of less than 250 nm and height to diameter ratio greater than 1.5, wherein the method does not utilize ultra-violet light.

2. The method of claim 1, wherein the dopant comprises a substance selected from a group consisting of metals and semiconductors.

3. The method of claim 2, wherein the dopant comprises nano-particles of the substance.

4. The method of claim 1, wherein:
    the dopant comprises nano-particles of silicon; and
    the carbon-containing polymerizable substance comprises polyacrylonitrile.

5. The method of claim 1, wherein carbonization is performed under an elevated-temperature regimen and in an inert-atmosphere environment in which the precursor is converted to a corresponding nano-architectured carbon/activated carbon structure.

6. The method of claim 1, wherein carbonization is performed under an elevated-temperature regimen and in an inert-atmosphere environment in which the precursor is converted to a corresponding nano-architectured graphite carbon structure.

7. The method of claim 1, wherein the starting material is polyacrylonitrile (PAN), the method further comprising stabilizing the nano-molded starting material by incubation at a temperature at which molecules of the PAN are cyclized, the incubation being conducted in an atmosphere that prevents combustion of the precursor.

8. The method of claim 1, wherein the nano-architectured doped carbon structure is a nano-architectured carbon electrode.

9. The method of claim 1, wherein the mold and surface of the unit are separated from each other to form the carbonization precursor having a nano-pillar molded surface by contacting the mold with a substrate.

10. The method of claim 1, further comprising, after separating the mold and the molded nano-pillars, stabilizing the molded nano-pillars prior to the carbonization of the precursor.

11. The method of claim 1, wherein the height to diameter ratio is greater than 2.5.

12. A method for forming a nano-molded carbonization precursor, comprising:
    forming a mold having a surface defining a desired pattern of nano-concavities corresponding to a desired patterned array of nano-pillars having a nano-pillar diameter of less than 250 nm and a height to diameter ratio greater than two;
    preparing a starting material comprising a polymerizable carbon-containing substance and at least one dopant, the starting material being sufficiently fluid to have a moldable surface;
    wherein preparing the starting material comprises preparing a suspension of nano-particles in a solvent for the polymerizable carbon-containing substance, and adding the suspension to the polymerizable carbon-containing substance;
    bringing the surface of the mold and the starting material together without applying pressure such that the nano-concavities mold the desired patterned array of nano-pillars onto the moldable surface;
    removing the solvent; and when the nano-pillars formed by the mold on the moldable surface have reached at least a threshold level of self-supportability, non-destructively separating the mold and a surface of a unit of molded nano-pillars from each other to form a carbonization precursor having a nano-pillar molded surface, wherein the method does not utilize ultra-violet light.

13. The method of claim 12, wherein the starting material is polyacrylonitrile (PAN).

14. A method for forming a nano-architectured carbon structure, comprising:
forming a mold;
in a surface of the mold, forming a desired pattern of nano-concavities corresponding to a desired patterned array of nano-pillars;
preparing a liquid starting material comprising a solvent, a polymerizable carbon-containing compound, and at least one dopant;
forming a film of the starting material having first and second surfaces;
using the mold, nano-molding the desired patterned array of nano-pillars into the first surface by contacting the mold and the first surface without applying pressure, the nano-pillars having a diameter of less than 250 nm;
removing the solvent and stabilizing the nano-molded film; and
non-destructively removing the mold from the first surface to form a carbonization precursor, wherein the method does not utilize ultra-violet light.

15. The method of claim 14, wherein:
the liquid starting material is a carbon-containing starting material comprising at least one dopant; and
the method further comprises forming a carbonization precursor of the film, and carbonizing the precursor.

16. The method of claim 14, wherein the starting material is polyacrylonitrile (PAN).

\* \* \* \* \*